(12) United States Patent
Grohoski et al.

(10) Patent No.: US 8,301,865 B2
(45) Date of Patent: Oct. 30, 2012

(54) SYSTEM AND METHOD TO MANAGE ADDRESS TRANSLATION REQUESTS

(75) Inventors: Gregory F. Grohoski, Bee Cave, TX (US); Paul J. Jordan, Austin, TX (US); Mark A. Luttrell, Cedar Park, TX (US); Zeid Hartuon Samoail, Austin, TX (US); Robert T. Golla, Round Rock, TX (US)

(73) Assignee: Oracle America, Inc., Redwood City, CA (US)

( * ) Notice: Subject to any disclaimer, the term of this patent is extended or adjusted under 35 U.S.C. 154(b) by 631 days.

(21) Appl. No.: 12/493,941

(22) Filed: Jun. 29, 2009

(65) Prior Publication Data

US 2010/0332787 A1    Dec. 30, 2010

(51) Int. Cl.
*G06F 12/00* (2006.01)
*G06F 9/26* (2006.01)
*G06F 9/34* (2006.01)

(52) U.S. Cl. ........ 711/207; 711/200; 711/201; 711/202; 711/203; 711/204; 711/205; 711/206

(58) Field of Classification Search ................ None
See application file for complete search history.

(56) References Cited

U.S. PATENT DOCUMENTS

| | | | |
|---|---|---|---|
| 5,282,274 A | 1/1994 | Liu | |
| 5,493,660 A | 2/1996 | Delano et al. | |
| 5,787,494 A | 7/1998 | Delano et al. | |
| 6,092,172 A * | 7/2000 | Nishimoto et al. | 711/207 |
| 7,111,145 B1 | 9/2006 | Chen et al. | |
| 7,475,220 B1 * | 1/2009 | Hastings | 711/207 |
| 7,991,977 B2 * | 8/2011 | Hass et al. | 711/207 |
| 2007/0067567 A1 * | 3/2007 | Jiao et al. | 711/118 |
| 2007/0067572 A1 * | 3/2007 | Jiao et al. | 711/125 |
| 2007/0180156 A1 * | 8/2007 | Irish et al. | 710/5 |
| 2008/0282034 A1 * | 11/2008 | Jiao et al. | 711/125 |

* cited by examiner

*Primary Examiner* — Yaima Campos
(74) *Attorney, Agent, or Firm* — Robert C. Kowert; Meyertons, Hood, Kivlin, Kowert & Goetzel, P.C.

(57) ABSTRACT

A system and method for servicing translation lookaside buffer (TLB) misses may manage separate input and output pipelines within a memory management unit. A pending request queue (PRQ) in the input pipeline may include an instruction-related portion storing entries for instruction TLB (ITLB) misses and a data-related portion storing entries for potential or actual data TLB (DTLB) misses. A DTLB PRQ entry may be allocated to each load/store instruction selected from the pick queue. The system may select an ITLB- or DTLB-related entry for servicing dependent on prior PRQ entry selection(s). A corresponding entry may be held in a translation table entry return queue (TTERQ) in the output pipeline until a matching address translation is received from system memory. PRQ and/or TTERQ entries may be deallocated when a corresponding TLB miss is serviced. PRQ and/or TTERQ entries associated with a thread may be deallocated in response to a thread flush.

20 Claims, 9 Drawing Sheets

SYSTEM AND METHOD TO MANAGE ADDRESS TRANSLATION REQUESTS

BACKGROUND OF THE INVENTION

1. Field of the Invention

This invention relates to multithreaded processors and, more specifically, to management of virtual and/or real address to physical address translations requests.

2. Description of the Related Art

Modern computer processors typically achieve high throughput through multithreaded cores that simultaneously execute multiple threads. Each thread may include a set of instructions that execute independently of instructions from another thread. For example, an individual software process, such as an application, may consist of one or more threads that may be scheduled for parallel execution by an operating system. Threading can be an efficient way to improve processor throughput without increasing die size. This is particularly true with modern web-oriented and business applications, which typically do not fully utilize the resources of an individual processor pipeline. Multithreading may lead to more efficient use of processor resources and improved processor performance, as resources are less likely to sit idle with the threads operating in different stages of execution.

Current multithreaded processors typically sacrifice single thread performance to achieve an overall, high throughput within the processor. In other words, the aggregate throughput of each core on the processor may be high, but the performance of a single thread on the core may be relatively low. The resources within typical multithreaded processors, particularly resources for handling virtual and/or real address to physical address translations, are designed to support serial instruction execution without any speculative execution along predicted branch paths. For example, memory management resources designed to provide address translation requests that cannot be located in translation lookaside buffers (TLBs) are typically designed to support one address translation request at a time, serially, and to support address translation requests originating only from threads operating on confirmed branch paths.

SUMMARY

Various embodiments of a system and method for managing address translation requests associated with translation lookaside buffer (TLB) misses are disclosed. In some embodiments, TLBs may be used to cache a subset of virtual to physical address translations and/or real to physical address translations, which may map virtual system memory to physical memory. In such embodiments, a TLB miss may occur when a required address translation is not located in an instruction TLB (ITLB) or data TLB (DTLB) within a processor core.

Single thread performance within a high throughput, multithreaded core may be improved by implementing out of order execution of instructions and speculative execution of instructions within a single thread. In some embodiments, out of order instruction execution may result in an increased number of TLB misses and speculative execution of instructions may lead to speculative TLB misses. In order to support improved single thread performance, a memory management unit may be configured to manage speculative TLB misses and an overall increased number of TLB misses. In some embodiments, the memory management unit may effectively manage TLB misses by handling misses fairly within a single thread and between multiple threads, processing TLB misses in parallel, and efficiently reclaiming resources allocated to TLB misses associated with a flushed thread.

In some embodiments, a memory management unit within a processor core may be configured to service ITLB and DTLB misses from multiple threads executing on the core. The memory management unit may include separate input and output pipelines for managing TLB misses. In some embodiments, the input pipeline may include a pending request queue (PRQ) containing two array portions: a portion containing entries corresponding to ITLB misses and a portion containing entries corresponding to potential DTLB misses. In some embodiments, an entry in the ITLB portion of the PRQ may be allocated for an ITLB miss when the ITLB miss occurs, or when an indication of an ITLB miss is received. In some embodiments, an entry in the DTLB portion of the PRQ may be allocated for a load/store instruction when the instruction is selected for execution. In such embodiments, the PRQ entry may be allocated for a potential DTLB miss, such that the PRQ entry may be available if the load/store instruction encounters a DTLB miss during execution. In some embodiments, the PRQ entry allocated to the potential DTLB miss may be deallocated if the address translation required for the load/store instruction hits in the DTLB during execution.

In some embodiments, the memory management unit may be configured to select between a pending address translation request associated with an ITLB miss and one associated with a DTLB miss when determining a next TLB miss to service. For example, the memory management unit may be configured to select either the oldest ITLB miss or the oldest DTLB miss for servicing, depending on a prior history of TLB miss selections. In this example, the memory management unit may be configured to alternate between selecting one or more ITLB misses to service and selecting one or more DTLB misses to service according to a predetermined policy.

In some embodiments, the output pipeline may include a translation table entry return queue (TTERQ). Upon selection of an ITLB or DTLB miss for servicing, the memory management unit may be configured to allocate a TTERQ entry to the TLB miss. The memory management unit may be configured to service a TLB miss by executing one or more hardware table walks within system memory page tables to attempt to locate the address translation requested in response to the TLB miss. The memory management unit may be configured to request address translations from the L2 cache. The L2 cache may be configured to return contents of a page table (e.g., a page table entry), which may or may not include the requested address translation, and to buffer the returned data in a TTERQ entry corresponding to a TLB miss. The memory management unit may be configured to return an address translation stored in the TTERQ to the appropriate TLB if a valid response to the requested address translation is found in the corresponding TTERQ entry, or to return an exception to the TLB indicating that an address translation was not found. In some embodiments, the PRQ and TTERQ entries corresponding to the TLB miss may be deallocated when a response is sent to the appropriate TLB.

In some embodiments, various system events, such as branch mispredictions, instruction exceptions, or external interrupts, may result in a thread flush. In some such embodiments, all PRQ and/or TTERQ entries corresponding to TLB misses associated with the flushed thread may be deallocated in response to receiving an indication of the thread flush. In various embodiments, a thread may be flushed while the memory management unit is waiting for system memory to return an address translation response to a TLB miss associated with the flushed thread. In some embodiments, the TTERQ entry corresponding to the TLB miss may be deallocated after the response is returned from system memory.

While the invention is described herein by way of example for several embodiments and illustrative drawings, those skilled in the art will recognize that the invention is not limited to the embodiments or drawings described. It should be understood that the drawings and detailed description hereto are not intended to limit the invention to the particular form disclosed, but on the contrary, the invention is to cover all modifications, equivalents and alternatives falling within the spirit and scope of the present invention as defined by the appended claims. Any headings used herein are for organizational purposes only and are not meant to limit the scope of the description or the claims. As used herein, the word "may" is used in a permissive sense (i.e. meaning having the potential to) rather than the mandatory sense (i.e. meaning must). Similarly, the words "include", "including", and "includes" mean including, but not limited to.

DETAILED DESCRIPTION OF EMBODIMENTS

Overview of Multithreaded Processor Architecture

Figure 1:
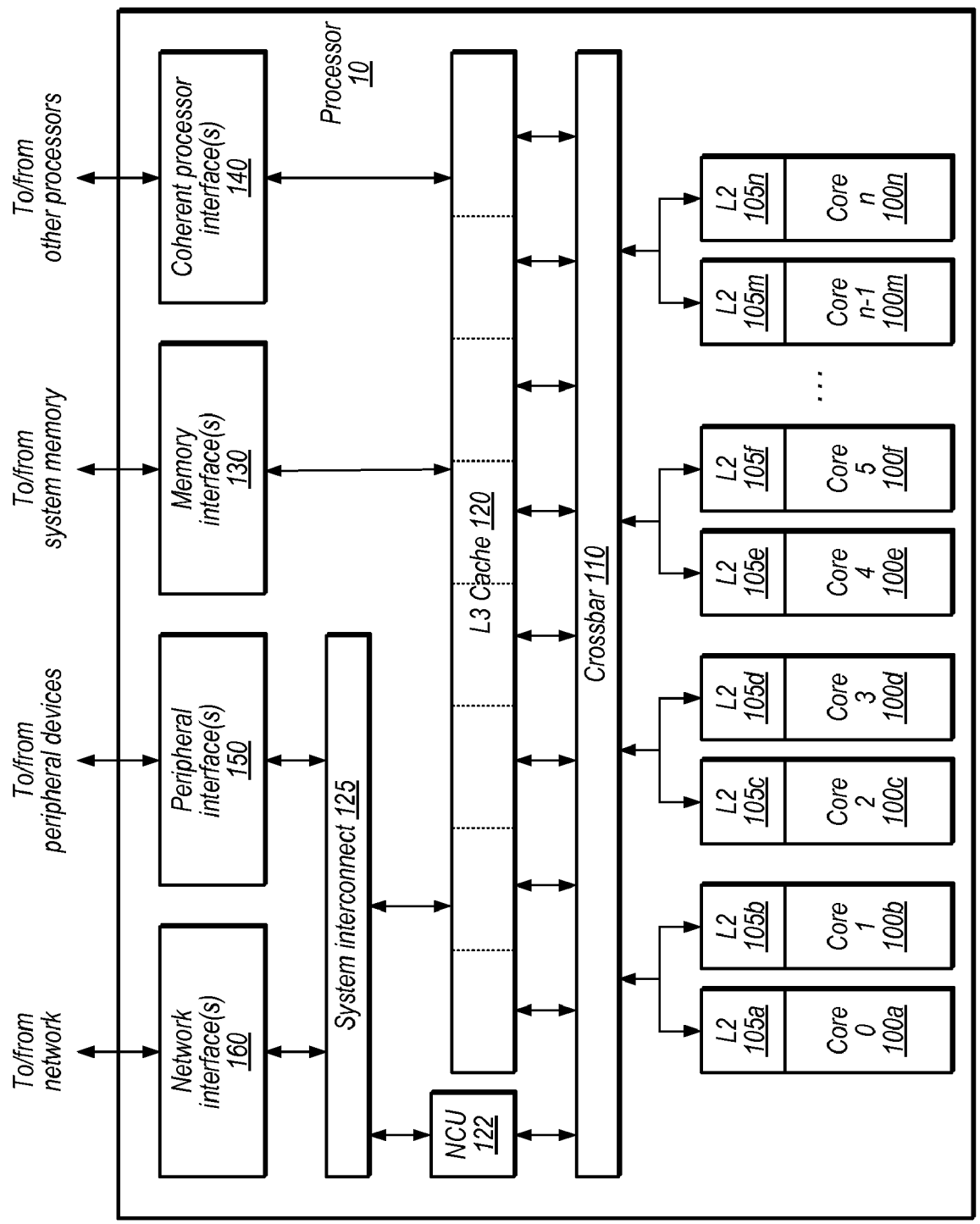
FIG. 1 is a block diagram illustrating one embodiment of a multithreaded processor.

A block diagram illustrating one embodiment of a multithreaded processor 10 is shown in FIG. 1. In the illustrated embodiment, processor 10 includes a number of processor cores 100a-n, which are also designated "core 0" though "core n." Various embodiments of processor 10 may include varying numbers of cores 100, such as 8, 16, or any other suitable number. Each of cores 100 is coupled to a corresponding L2 cache 105a-n, which in turn couple to L3 cache 120 via a crossbar 110. Cores 100a-n and L2 caches 105a-n may be generically referred to, either collectively or individually, as core(s) 100 and L2 cache(s) 105, respectively.

Via crossbar 110 and L3 cache 120, cores 100 may be coupled to a variety of devices that may be located externally to processor 10. In the illustrated embodiment, one or more memory interface(s) 130 may be configured to couple to one or more banks of system memory (not shown). One or more coherent processor interface(s) 140 may be configured to couple processor 10 to other processors (e.g., in a multiprocessor environment employing multiple units of processor 10). Additionally, system interconnect 125 couples cores 100 to one or more peripheral interface(s) 150 and network interface(s) 160. As described in greater detail below, these interfaces may be configured to couple processor 10 to various peripheral devices and networks.

Cores 100 may be configured to execute instructions and to process data according to a particular instruction set architecture (ISA). In some embodiments, cores 100 may be configured to implement a version of the SPARC® ISA, such as SPARC® V9, UltraSPARC Architecture 2005, UltraSPARC Architecture 2007, or UltraSPARC Architecture 2009, for example. However, in other embodiments it is contemplated that any desired ISA may be employed, such as x86 (32-bit or 64-bit versions), PowerPC® or MIPS®, for example.

In the illustrated embodiment, each of cores 100 may be configured to operate independently of the others, such that all cores 100 may execute in parallel. Additionally, as described below in conjunction with the description of FIG. 2, in some embodiments, each of cores 100 may be configured to execute multiple threads concurrently, where a given thread may include a set of instructions that may execute independently of instructions from another thread. (For example, an individual software process, such as an application, may consist of one or more threads that may be scheduled for execution by an operating system.) Such a core 100 may also be referred to as a multithreaded (MT) core. In some embodiments, each of cores 100 may be configured to concurrently execute instructions from a variable number of threads, up to eight concurrently-executing threads. In a 16-core implementation, processor 10 could thus concurrently execute up to 128 threads. However, in other embodiments it is contemplated that other numbers of cores 100 may be provided, and that cores 100 may concurrently process different numbers of threads.

Additionally, as described in greater detail below, in some embodiments, each of cores 100 may be configured to execute certain instructions out of program order, which may also be referred to herein as out of order execution, or simply OOO. As an example of out of order execution, for a particular thread, there may be instructions that are subsequent in program order to a given instruction yet do not depend on the given instruction. If execution of the given instruction is delayed for some reason (e.g., owing to a cache miss), the later instructions may execute before the given instruction completes, which may improve overall performance of the executing thread.

As shown in FIG. 1, in some embodiments, each core 100 may have a dedicated corresponding L2 cache 105. In some embodiments, L2 cache 105 may be configured as a set-associative, writeback cache that is fully inclusive of first-level cache state (e.g., instruction and data caches within core 100). To maintain coherence with first-level caches, embodiments of L2 cache 105 may implement a reverse directory that maintains a virtual copy of the first-level cache tags. L2 cache 105 may implement a coherence protocol (e.g., the MESI protocol) to maintain coherence with other caches within processor 10. In some embodiments, L2 cache 105 may enforce a Total Store Ordering (TSO) model of execution in which all store instructions from the same thread must complete in program order.

In various embodiments, L2 cache 105 may include a variety of structures configured to support cache functionality and performance. For example, L2 cache 105 may include a miss buffer configured to store requests that miss the L2, a fill buffer configured to temporarily store data returning from L3 cache 120, a writeback buffer configured to temporarily store dirty evicted data and snoop copyback data, and/or a snoop buffer configured to store snoop requests received from L3 cache 120. In some embodiments, L2 cache 105 may implement a history-based prefetcher that may attempt to analyze L2 miss behavior and correspondingly generate prefetch requests to L3 cache 120.

Crossbar 110 may be configured to manage data flow between L2 caches 105 and the shared L3 cache 120. In some embodiments, crossbar 110 may include logic (such as multiplexers or a switch fabric, for example) that allows any L2 cache 105 to access any bank of L3 cache 120, and that conversely allows data to be returned from any L3 bank to any L2 cache 105. That is, crossbar 110 may be configured as an M-to-N crossbar that allows for generalized point-to-point communication. However, in other embodiments, other interconnection schemes may be employed between L2 caches 105 and L3 cache 120. For example, a mesh, ring, or other suitable topology may be utilized.

Crossbar 110 may be configured to concurrently process data requests from L2 caches 105 to L3 cache 120 as well as data responses from L3 cache 120 to L2 caches 105. In some embodiments, crossbar 110 may include logic to queue data requests and/or responses, such that requests and responses may not block other activity while waiting for service. Additionally, in some embodiments crossbar 110 may be configured to arbitrate conflicts that may occur when multiple L2 caches 105 attempt to access a single bank of L3 cache 120, or vice versa.

L3 cache 120 may be configured to cache instructions and data for use by cores 100. In the illustrated embodiment, L3 cache 120 may be organized into eight separately addressable banks that may each be independently accessed, such that in the absence of conflicts, each bank may concurrently return data to a respective L2 cache 105. In some embodiments, each individual bank may be implemented using set-associative or direct-mapped techniques. For example, in some embodiments, L3 cache 120 may be an 8 megabyte (MB) cache, where each 1 MB bank is 16-way set associative with a 64-byte line size. L3 cache 120 may be implemented in some embodiments as a writeback cache in which written (dirty) data may not be written to system memory until a corresponding cache line is evicted. However, it is contemplated that in other embodiments, L3 cache 120 may be configured in any suitable fashion. For example, L3 cache 120 may be implemented with more or fewer banks, or in a scheme that does not employ independently-accessible banks; it may employ other bank sizes or cache geometries (e.g., different line sizes or degrees of set associativity); it may employ write-through instead of writeback behavior; and it may or may not allocate on a write miss. Other variations of L3 cache 120 configuration are possible and contemplated.

In some embodiments, L3 cache 120 may implement queues for requests arriving from and results to be sent to crossbar 110. Additionally, in some embodiments L3 cache 120 may implement a fill buffer configured to store fill data arriving from memory interface 130, a writeback buffer configured to store dirty evicted data to be written to memory, and/or a miss buffer configured to store L3 cache accesses that cannot be processed as simple cache hits (e.g., L3 cache misses, cache accesses matching older misses, accesses such as atomic operations that may require multiple cache accesses, etc.). L3 cache 120 may variously be implemented as single-ported or multiported (i.e. capable of processing multiple concurrent read and/or write accesses). In either case, L3 cache 120 may implement arbitration logic to prioritize cache access among various cache read and write requesters.

Not all external accesses from cores 100 necessarily proceed through L3 cache 120. In the illustrated embodiment, non-cacheable unit (NCU) 122 may be configured to process requests from cores 100 for non-cacheable data, such as data from I/O devices as described below with respect to peripheral interface(s) 150 and network interface(s) 160.

Memory interface 130 may be configured to manage the transfer of data between L3 cache 120 and system memory, for example in response to cache fill requests and data evictions. In some embodiments, multiple instances of memory interface 130 may be implemented, with each instance configured to control a respective bank of system memory. Memory interface 130 may be configured to interface to any suitable type of system memory, such as Fully Buffered Dual Inline Memory Module (FB-DIMM), Double Data Rate or Double Data Rate 2, 3, or 4 Synchronous Dynamic Random Access Memory (DDR/DDR2/DDR3/DDR4 SDRAM), or Rambus® DRAM (RDRAM®), for example. In some embodiments, memory interface 130 may be configured to support interfacing to multiple different types of system memory.

In the illustrated embodiment, processor 10 may also be configured to receive data from sources other than system memory. System interconnect 125 may be configured to provide a central interface for such sources to exchange data with cores 100, L2 caches 105, and/or L3 cache 120. In some embodiments, system interconnect 125 may be configured to coordinate Direct Memory Access (DMA) transfers of data to and from system memory. For example, via memory interface 130, system interconnect 125 may coordinate DMA transfers between system memory and a network device attached via network interface 160, or between system memory and a peripheral device attached via peripheral interface 150.

Processor 10 may be configured for use in a multiprocessor environment with other instances of processor 10 or other compatible processors. In the illustrated embodiment, coherent processor interface(s) 140 may be configured to implement high-bandwidth, direct chip-to-chip communication between different processors in a manner that preserves memory coherence among the various processors (e.g., according to a coherence protocol that governs memory transactions).

Peripheral interface 150 may be configured to coordinate data transfer between processor 10 and one or more peripheral devices. Such peripheral devices may include, for example and without limitation, storage devices (e.g., magnetic or optical media-based storage devices including hard drives, tape drives, CD drives, DVD drives, etc.), display devices (e.g., graphics subsystems), multimedia devices (e.g., audio processing subsystems), or any other suitable type of peripheral device. In some embodiments, peripheral interface 150 may implement one or more instances of a standard peripheral interface. For example, some embodiments of peripheral interface 150 may implement the Peripheral Component Interface Express (PCI Express™ or PCIe) standard according to generation 1.x, 2.0, 3.0, or another suitable variant of that standard, with any suitable number of I/O lanes. However, it is contemplated that any suitable interface standard or combination of standards may be employed. For example, in some embodiments peripheral interface 150 may be configured to implement a version of Universal Serial Bus (USB) protocol or IEEE 1394 (Firewire®) protocol in addition to or instead of PCI Express™.

Network interface 160 may be configured to coordinate data transfer between processor 10 and one or more network devices (e.g., networked computer systems or peripherals) coupled to processor 10 via a network. In some embodiments, network interface 160 may be configured to perform the data processing necessary to implement an Ethernet (IEEE 802.3) networking standard such as Gigabit Ethernet or 10-Gigabit Ethernet, for example. However, it is contemplated that any suitable networking standard may be implemented, including forthcoming standards such as 40-Gigabit Ethernet and 100-Gigabit Ethernet. In some embodiments, network interface 160 may be configured to implement other types of networking protocols, such as Fibre Channel, Fibre Channel over Ethernet (FCoE), Data Center Ethernet, Infiniband, and/or other suitable networking protocols. In some embodiments, network interface 160 may be configured to implement multiple discrete network interface ports.

Overview of Dynamic Multithreading Processor Core

As mentioned above, in some embodiments each of cores 100 may be configured for multithreaded, out of order execution. More specifically, in some embodiments, each of cores 100 may be configured to perform dynamic multithreading. Generally speaking, under dynamic multithreading, the execution resources of cores 100 may be configured to efficiently process varying types of computational workloads that exhibit different performance characteristics and resource requirements. Such workloads may vary across a continuum that emphasizes different combinations of individual-thread and multiple-thread performance.

At one end of the continuum, a computational workload may include a number of independent tasks, where completing the aggregate set of tasks within certain performance criteria (e.g., an overall number of tasks per second) is a more significant factor in system performance than the rate at which any particular task is completed. For example, in certain types of server or transaction processing environments, there may be a high volume of individual client or customer requests (such as web page requests or file system accesses). In this context, individual requests may not be particularly sensitive to processor performance. For example, requests may be I/O-bound rather than processor-bound—completion of an individual request may require I/O accesses (e.g., to relatively slow memory, network, or storage devices) that dominate the overall time required to complete the request, relative to the processor effort involved. Thus, a processor that is capable of concurrently processing many such tasks (e.g., as independently executing threads) may exhibit better performance on such a workload than a processor that emphasizes the performance of only one or a small number of concurrent tasks.

At the other end of the continuum, a computational workload may include individual tasks whose performance is highly processor-sensitive. For example, a task that involves significant mathematical analysis and/or transformation (e.g., cryptography, graphics processing, scientific computing) may be more processor-bound than I/O-bound. Such tasks may benefit from processors that emphasize single-task performance, for example through speculative execution and exploitation of instruction-level parallelism.

Dynamic multithreading represents an attempt to allocate processor resources in a manner that flexibly adapts to workloads that vary along the continuum described above. In some embodiments, cores 100 may be configured to implement fine-grained multithreading, in which each core may select instructions to execute from among a pool of instructions corresponding to multiple threads, such that instructions from different threads may be scheduled to execute adjacently. For example, in a pipelined embodiment of core 100 employing fine-grained multithreading, instructions from different threads may occupy adjacent pipeline stages, such that instructions from several threads may be in various stages of execution during a given core processing cycle. Through the use of fine-grained multithreading, cores 100 may be configured to efficiently process workloads that depend more on concurrent thread processing than individual thread performance.

In some embodiments, cores 100 may also be configured to implement out of order processing, speculative execution, register renaming and/or other features that improve the performance of processor-dependent workloads. Moreover, cores 100 may be configured to dynamically allocate a variety of hardware resources among the threads that are actively executing at a given time, such that if fewer threads are executing, each individual thread may be able to take advantage of a greater share of the available hardware resources. This may result in increased individual thread performance when fewer threads are executing, while retaining the flexibility to support workloads that exhibit a greater number of threads that are less processor-dependent in their performance. In various embodiments, the resources of a given core 100 that may be dynamically allocated among a varying number of threads may include branch resources (e.g., branch predictor structures), load/store resources (e.g., load/store buffers and queues), instruction completion resources (e.g., reorder buffer structures and commit logic), instruction issue resources (e.g., instruction selection and scheduling structures), register rename resources (e.g., register mapping tables), and/or memory management unit resources (e.g., translation lookaside buffers, page walk resources).

Figure 2:
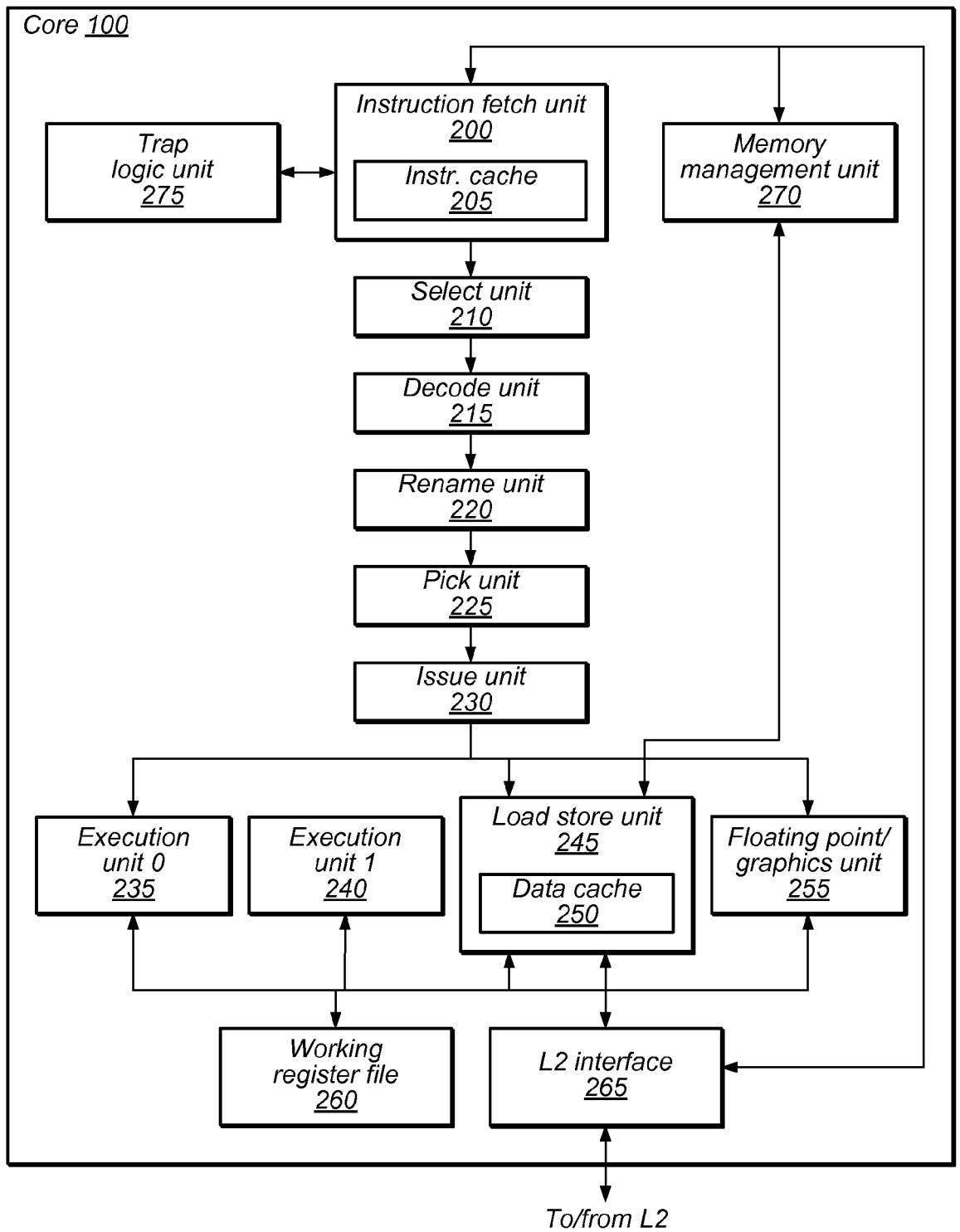
FIG. 2 is a block diagram illustrating one embodiment of a processor core configured to perform fine-grained multithreading.

One embodiment of core 100 that is configured to perform dynamic multithreading is illustrated in FIG. 2. In the illustrated embodiment, core 100 includes an instruction fetch unit (IFU) 200 that includes an instruction cache 205. IFU 200 is coupled to a memory management unit (MMU) 270, L2 interface 265, and trap logic unit (TLU) 275. IFU 200 is additionally coupled to an instruction processing pipeline that begins with a select unit 210 and proceeds in turn through a decode unit 215, a rename unit 220, a pick unit 225, and an issue unit 230. Issue unit 230 is coupled to issue instructions to any of a number of instruction execution resources: an execution unit 0 (EXU0) 235, an execution unit 1 (EXU1) 240, a load store unit (LSU) 245 that includes a data cache 250, and/or a floating point/graphics unit (FGU) 255. These instruction execution resources are coupled to a working register file 260. Additionally, LSU 245 is coupled to L2 interface 265 and MMU 270.

In the following discussion, various embodiments of each of the structures of the illustrated embodiment of core 100 are described. However, it is noted that the illustrated partitioning of resources is merely one example of how core 100 may be implemented. Alternative configurations and variations are possible and contemplated.

Instruction fetch unit 200 may be configured to provide instructions to the rest of core 100 for execution. In some embodiments, IFU 200 may be configured to select a thread to be fetched, fetch instructions from instruction cache 205 for the selected thread and buffer them for downstream processing, request data from L2 cache 105 in response to instruction cache misses, and predict the direction and target of control transfer instructions (e.g., branches). In some embodiments, IFU 200 may include a number of data structures in addition to instruction cache 205, such as an instruction translation lookaside buffer (ITLB), instruction buffers, and/or structures configured to store state that is relevant to thread selection and processing.

In some embodiments, during each execution cycle of core 100, IFU 200 may be configured to select one thread that will enter the IFU processing pipeline. Thread selection may take into account a variety of factors and conditions, some thread-specific and others IFU-specific. For example, certain instruction cache activities (e.g., cache fill), ITLB activities, or diagnostic activities may inhibit thread selection if these activities are occurring during a given execution cycle. Additionally, individual threads may be in specific states of readiness that affect their eligibility for selection. For example, a thread for which there is an outstanding instruction cache miss may not be eligible for selection until the miss is resolved. In some embodiments, those threads that are eligible to participate in thread selection may be divided into groups by priority, for example depending on the state of the thread or of the ability of the IFU pipeline to process the thread. In such embodiments, multiple levels of arbitration may be employed to perform thread selection: selection occurs first by group priority, and then within the selected group according to a suitable arbitration algorithm (e.g., a least-recently-fetched algorithm). However, it is noted that any suitable scheme for thread selection may be employed, including arbitration schemes that are more complex or simpler than those mentioned here.

Once a thread has been selected for fetching by IFU 200, instructions may actually be fetched for the selected thread. To perform the fetch, in some embodiments, IFU 200 may be configured to generate a fetch address to be supplied to instruction cache 205. In various embodiments, the fetch address may be generated as a function of a program counter associated with the selected thread, a predicted branch target address, or an address supplied in some other manner (e.g., through a test or diagnostic mode). The generated fetch address may then be applied to instruction cache 205 to determine whether there is a cache hit.

In some embodiments, accessing instruction cache 205 may include performing fetch address translation (e.g., in the case of a physically indexed and/or tagged cache), accessing a cache tag array, and comparing a retrieved cache tag to a requested tag to determine cache hit status. If there is a cache hit, IFU 200 may store the retrieved instructions within buffers for use by later stages of the instruction pipeline. If there is a cache miss, IFU 200 may coordinate retrieval of the missing cache data from L2 cache 105. In some embodiments, IFU 200 may also be configured to prefetch instructions into instruction cache 205 before the instructions are actually required to be fetched. For example, in the case of a cache miss, IFU 200 may be configured to retrieve the missing data for the requested fetch address as well as addresses that sequentially follow the requested fetch address, on the assumption that the following addresses are likely to be fetched in the near future.

In many ISAs, instruction execution proceeds sequentially according to instruction addresses (e.g., as reflected by one or more program counters). However, control transfer instructions (CTIs) such as branches, call/return instructions, or other types of instructions may cause the transfer of execution from a current fetch address to a nonsequential address. As mentioned above, IFU 200 may be configured to predict the direction and target of CTIs (or, in some embodiments, a subset of the CTIs that are defined for an ISA) in order to reduce the delays incurred by waiting until the effect of a CTI is known with certainty. In some embodiments, IFU 200 may be configured to implement a perceptron-based dynamic branch predictor, although any suitable type of branch predictor may be employed.

To implement branch prediction, IFU 200 may implement a variety of control and data structures in various embodiments, such as history registers that track prior branch history, weight tables that reflect relative weights or strengths of predictions, and/or target data structures that store fetch addresses that are predicted to be targets of a CTI. Also, in some embodiments, IFU 200 may further be configured to partially decode (or predecode) fetched instructions in order to facilitate branch prediction. A predicted fetch address for a given thread may be used as the fetch address when the given thread is selected for fetching by IFU 200. The outcome of the prediction may be validated when the CTI is actually executed (e.g., if the CTI is a conditional instruction, or if the CTI itself is in the path of another predicted CTI). If the prediction was incorrect, instructions along the predicted path that were fetched and issued may be cancelled.

Through the operations discussed above, IFU 200 may be configured to fetch and maintain a buffered pool of instructions from one or multiple threads, to be fed into the remainder of the instruction pipeline for execution. Generally speaking, select unit 210 may be configured to select and schedule threads for execution. In some embodiments, during any given execution cycle of core 100, select unit 210 may be configured to select up to one ready thread out of the maximum number of threads concurrently supported by core 100 (e.g., 8 threads), and may select up to two instructions from the selected thread for decoding by decode unit 215, although in other embodiments, a differing number of threads and instructions may be selected. In various embodiments, different conditions may affect whether a thread is ready for selection by select unit 210, such as branch mispredictions, unavailable instructions, or other conditions. To ensure fairness in thread selection, some embodiments of select unit 210 may employ arbitration among ready threads (e.g. a least-recently-used algorithm).

The particular instructions that are selected for decode by select unit 210 may be subject to the decode restrictions of decode unit 215; thus, in any given cycle, fewer than the maximum possible number of instructions may be selected. Additionally, in some embodiments, select unit 210 may be configured to allocate certain execution resources of core 100 to the selected instructions, so that the allocated resources will not be used for the benefit of another instruction until they are released. For example, select unit 210 may allocate resource tags for entries of a reorder buffer, load/store buffers, or other downstream resources that may be utilized during instruction execution.

Generally, decode unit 215 may be configured to prepare the instructions selected by select unit 210 for further processing. Decode unit 215 may be configured to identify the particular nature of an instruction (e.g., as specified by its opcode) and to determine the source and sink (i.e. destination) registers encoded in an instruction, if any. In some embodiments, decode unit 215 may be configured to detect certain dependencies among instructions, to remap architectural registers to a flat register space, and/or to convert certain complex instructions to two or more simpler instructions for execution. Additionally, in some embodiments, decode unit 215 may be configured to assign instructions to slots for subsequent scheduling. In some embodiments, two slots 0-1 may be defined, where slot 0 includes instructions executable in load/store unit 245 or execution units 235-240, and where slot 1 includes instructions executable in execution units 235-240, floating point/graphics unit 255, and any branch instructions. However, in other embodiments, other numbers of slots and types of slot assignments may be employed, or slots may be omitted entirely.

Register renaming may facilitate the elimination of certain dependencies between instructions (e.g., write-after-read or "false" dependencies), which may in turn prevent unnecessary serialization of instruction execution. In some embodiments, rename unit 220 may be configured to rename the logical (i.e. architected) destination registers specified by instructions by mapping them to a physical register space, resolving false dependencies in the process. In some embodiments, rename unit 220 may maintain mapping tables that reflect the relationship between logical registers and the physical registers to which they are mapped.

Once decoded and renamed, instructions may be ready to be scheduled for execution. In the illustrated embodiment, pick unit 225 may be configured to pick instructions that are ready for execution and send the picked instructions to issue unit 230. In some embodiments, pick unit 225 may be configured to maintain a pick queue that stores a number of decoded and renamed instructions as well as information about the relative age and status of the stored instructions. During each execution cycle, this embodiment of pick unit 225 may pick up to one instruction per slot. For example, taking instruction dependency and age information into account, for a given slot, pick unit 225 may be configured to pick the oldest instruction for the given slot that is ready to execute.

In some embodiments, pick unit 225 may be configured to support load/store speculation by retaining speculative load/store instructions (and, in some instances, their dependent instructions) after they have been picked. This may facilitate replaying of instructions in the event of load/store misspeculation. Additionally, in some embodiments, pick unit 225 may be configured to deliberately insert "holes" into the pipeline through the use of stalls, e.g., in order to manage downstream pipeline hazards such as synchronization of certain load/store or long-latency FGU instructions.

Issue unit 230 may be configured to provide instruction sources and data to the various execution units for picked instructions. In some embodiments, issue unit 230 may be configured to read source operands from the appropriate source, which may vary depending upon the state of the pipeline. For example, if a source operand depends on a prior instruction that is still in the execution pipeline, the operand may be bypassed directly from the appropriate execution unit result bus. Results may also be sourced from register files representing architectural (i.e. user-visible) as well as non-architectural state. In the illustrated embodiment, core 100 includes a working register file 260 that may be configured to store instruction results (e.g., integer results, floating point results, and/or condition code results) that have not yet been committed to architectural state, and which may serve as the source for certain operands. The various execution units may also maintain architectural integer, floating-point, and condition code state from which operands may be sourced.

Instructions issued from issue unit 230 may proceed to one or more of the illustrated execution units for execution. In some embodiments, each of EXU0 235 and EXU1 240 may be similarly or identically configured to execute certain integer-type instructions defined in the implemented ISA, such as arithmetic, logical, and shift instructions. In the illustrated embodiment, EXU0 235 may be configured to execute integer instructions issued from slot 0, and may also perform address calculations for load/store instructions executed by LSU 245. EXU1 240 may be configured to execute integer instructions issued from slot 1, as well as branch instructions.

In some embodiments, FGU instructions and multicycle integer instructions may be processed as slot 1 instructions that pass through the EXU1 240 pipeline, although some of these instructions may actually execute in other functional units.

In some embodiments, architectural and non-architectural register files may be physically implemented within or near execution units 235-240. It is contemplated that in some embodiments, core 100 may include more or fewer than two integer execution units, and the execution units may or may not be symmetric in functionality. Also, in some embodiments execution units 235-240 may not be bound to specific issue slots, or may be differently bound than just described.

Load store unit 245 may be configured to process data memory references, such as integer and floating-point load and store instructions and other types of memory reference instructions. LSU 245 may include a data cache 250 as well as logic configured to detect data cache misses and to responsively request data from L2 cache 105. In some embodiments, data cache 250 may be configured as a set-associative, write-through cache in which all stores are written to L2 cache 105 regardless of whether they hit in data cache 250. As noted above, the actual computation of addresses for load/store instructions may take place within one of the integer execution units, though in other embodiments, LSU 245 may implement dedicated address generation logic. In some embodiments, LSU 245 may implement an adaptive, history-dependent hardware prefetcher configured to predict and prefetch data that is likely to be used in the future, in order to increase the likelihood that such data will be resident in data cache 250 when it is needed.

In various embodiments, LSU 245 may implement a variety of structures configured to facilitate memory operations. For example, LSU 245 may implement a data TLB to cache virtual data address translations, as well as load and store buffers configured to store issued but not-yet-committed load and store instructions for the purposes of coherency snooping and dependency checking. LSU 245 may include a miss buffer configured to store outstanding loads and stores that cannot yet complete, for example due to cache misses. In some embodiments, LSU 245 may implement a store queue configured to store address and data information for stores that have committed, in order to facilitate load dependency checking. LSU 245 may also include hardware configured to support atomic load-store instructions, memory-related exception detection, and read and write access to special-purpose registers (e.g., control registers).

Floating point/graphics unit 255 may be configured to execute and provide results for certain floating-point and graphics-oriented instructions defined in the implemented ISA. For example, in some embodiments FGU 255 may implement single- and double-precision floating-point arithmetic instructions compliant with the IEEE 754-1985 floating-point standard, such as add, subtract, multiply, divide, and certain transcendental functions. Also, in some embodiments FGU 255 may implement partitioned-arithmetic and graphics-oriented instructions defined by a version of the SPARC® Visual Instruction Set (VIS™) architecture, such as VIS™ 2.0 or VIS™ 3.0. In some embodiments, FGU 255 may implement fused and unfused floating-point multiply-add instructions. Additionally, in some embodiments FGU 255 may implement certain integer instructions such as integer multiply, divide, and population count instructions. Depending on the implementation of FGU 255, some instructions (e.g., some transcendental or extended-precision instructions) or instruction operand or result scenarios (e.g., certain denormal operands or expected results) may be trapped and handled or emulated by software.

In some embodiments, FGU 255 may implement separate execution pipelines for floating point add/multiply, divide/square root, and graphics operations, while in other embodiments the instructions implemented by FGU 255 may be differently partitioned. In various embodiments, instructions implemented by FGU 255 may be fully pipelined (i.e. FGU 255 may be capable of starting one new instruction per execution cycle), partially pipelined, or may block issue until complete, depending on the instruction type. For example, in some embodiments floating-point add and multiply operations may be fully pipelined, while floating-point divide operations may block other divide/square root operations until completed.

Embodiments of FGU 255 may also be configured to implement hardware cryptographic support. For example, FGU 255 may include logic configured to support encryption/decryption algorithms such as Advanced Encryption Standard (AES), Data Encryption Standard/Triple Data Encryption Standard (DES/3DES), the Kasumi block cipher algorithm, and/or the Camellia block cipher algorithm. FGU 255 may also include logic to implement hash or checksum algorithms such as Secure Hash Algorithm (SHA-1, SHA-256, SHA-384, SHA-512), or Message Digest 5 (MD5). FGU 255 may also be configured to implement modular arithmetic such as modular multiplication, reduction and exponentiation, as well as various types of Galois field operations. In some embodiments, FGU 255 may be configured to utilize the floating-point multiplier array for modular multiplication. In various embodiments, FGU 255 may implement several of the aforementioned algorithms as well as other algorithms not specifically described.

The various cryptographic and modular arithmetic operations provided by FGU 255 may be invoked in different ways for different embodiments. In some embodiments, these features may be implemented via a discrete coprocessor that may be indirectly programmed by software, for example by using a control word queue defined through the use of special registers or memory-mapped registers. In another embodiment, the ISA may be augmented with specific instructions that may allow software to directly perform these operations.

As previously described, instruction and data memory accesses may involve translating virtual and/or real addresses to physical addresses. In some embodiments, such translation may occur on a page level of granularity, where a certain number of address bits comprise an offset into a given page of addresses, and the remaining address bits comprise a page number. For example, in an embodiment employing 4 MB pages, a 64-bit virtual address and a 40-bit physical address, 22 address bits (corresponding to 4 MB of address space, and typically the least significant address bits) may constitute the page offset. The remaining 42 bits of the virtual address may correspond to the virtual page number of that address, and the remaining 18 bits of the physical address may correspond to the physical page number of that address. In such an embodiment, virtual to physical address translation may occur by mapping a virtual page number to a particular physical page number, leaving the page offset unmodified.

Such translation mappings may be stored in an ITLB or a DTLB for rapid translation of virtual addresses during lookup of instruction cache 205 or data cache 250. In the event no translation for a given virtual page number is found in the appropriate TLB, MMU 270 may be configured to provide a translation. In some embodiments, MMU 270 may be configured to manage one or more translation tables stored in system memory and to traverse such tables (which in some embodiments may be hierarchically organized) in response to a request for an address translation, such as from an ITLB or DTLB miss. (Such a traversal may also be referred to as a page table walk or a hardware table walk.) In some embodiments, if MMU 270 is unable to derive a valid address translation, for example if one of the memory pages including a necessary page table is not resident in physical memory (i.e. a page miss), MMU 270 may be configured to generate a trap to allow a memory management software routine to handle the translation. It is contemplated that in various embodiments, any desirable page size may be employed. Further, in some embodiments multiple page sizes may be concurrently supported.

As noted above, several functional units in the illustrated embodiment of core 100 may be configured to generate off-core memory requests. For example, IFU 200 and LSU 245 each may generate access requests to L2 cache 105 in response to their respective cache misses. Additionally, MMU 270 may be configured to generate memory requests, for example while executing a page table walk. In the illustrated embodiment, L2 interface 265 may be configured to provide a centralized interface to the L2 cache 105 associated with a particular core 100, on behalf of the various functional units that may generate L2 accesses. In some embodiments, L2 interface 265 may be configured to maintain queues of pending L2 requests and to arbitrate among pending requests to determine which request or requests may be conveyed to L2 cache 105 during a given execution cycle. For example, L2 interface 265 may implement a least-recently-used or other algorithm to arbitrate among L2 requesters. In some embodiments, L2 interface 265 may also be configured to receive data returned from L2 cache 105, and to direct such data to the appropriate functional unit (e.g., to data cache 250 for a data cache fill due to miss).

During the course of operation of some embodiments of core 100, exceptional events may occur. For example, an instruction from a given thread that is selected for execution by select unit 210 may not be a valid instruction for the ISA implemented by core 100 (e.g., the instruction may have an illegal opcode), a floating-point instruction may produce a result that requires further processing in software, MMU 270 may not be able to complete a page table walk due to a page miss, a hardware error (such as uncorrectable data corruption in a cache or register file) may be detected, or any of numerous other possible architecturally-defined or implementation-specific exceptional events may occur. In some embodiments, trap logic unit 275 may be configured to manage the handling of such events. For example, TLU 275 may be configured to receive notification of an exceptional event occurring during execution of a particular thread, and to cause execution control of that thread to vector to a supervisor-mode software handler (i.e. a trap handler) corresponding to the detected event. Such handlers may include, for example, an illegal opcode trap handler configured to return an error status indication to an application associated with the trapping thread and possibly terminate the application, a floating-point trap handler configured to fix up an inexact result, etc.

In some embodiments, TLU 275 may be configured to flush all instructions from the trapping thread from any stage of processing within core 100, without disrupting the execution of other, non-trapping threads. In some embodiments, when a specific instruction from a given thread causes a trap (as opposed to a trap-causing condition independent of instruction execution, such as a hardware interrupt request), TLU 275 may implement such traps as precise traps. That is, TLU 275 may ensure that all instructions from the given thread that occur before the trapping instruction (in program order) complete and update architectural state, while no instructions from the given thread that occur after the trapping instruction (in program) order complete or update architectural state.

Additionally, in the absence of exceptions or trap requests, TLU 275 may be configured to initiate and monitor the commitment of working results to architectural state. For example, TLU 275 may include a reorder buffer (ROB) that coordinates transfer of speculative results into architectural state. TLU 275 may also be configured to coordinate thread flushing that results from branch misprediction. For instructions that are not flushed or otherwise cancelled due to mispredictions or exceptions, instruction processing may end when instruction results have been committed.

In various embodiments, any of the units illustrated in FIG. 2 may be implemented as one or more pipeline stages, to form an instruction execution pipeline that begins when thread fetching occurs in IFU 200 and ends with result commitment by TLU 275. Depending on the manner in which the functionality of the various units of FIG. 2 is partitioned and implemented, different units may require different numbers of cycles to complete their portion of instruction processing. In some instances, certain units (e.g., FGU 255) may require a variable number of cycles to complete certain types of operations.

Through the use of dynamic multithreading, in some instances, it is possible for each stage of the instruction pipeline of core 100 to hold an instruction from a different thread in a different stage of execution, in contrast to conventional processor implementations that typically require a pipeline flush when switching between threads or processes. In some embodiments, flushes and stalls due to resource conflicts or other scheduling hazards may cause some pipeline stages to have no instruction during a given cycle. However, in the fine-grained multithreaded processor implementation employed by the illustrated embodiment of core 100, such flushes and stalls may be directed to a single thread in the pipeline, leaving other threads undisturbed. Additionally, even if one thread being processed by core 100 stalls for a significant length of time (for example, due to an L2 cache miss), instructions from another thread may be readily selected for issue, thus increasing overall thread processing throughput.

As described previously, however, the various resources of core 100 that support fine-grained multithreaded execution may also be dynamically reallocated to improve the performance of workloads having fewer numbers of threads. Under these circumstances, some threads may be allocated a larger share of execution resources while other threads are allocated correspondingly fewer resources. Even when fewer threads are sharing comparatively larger shares of execution resources, however, core 100 may still exhibit the flexible, thread-specific flush and stall behavior described above.

Managing Address Translation Requests

Single thread performance within a high throughput, multithreaded core may be improved by implementing out of order execution of instructions and speculative execution of instructions within a single thread. As described above, out of order instruction execution may result in instructions executing in an order different than program order. Instructions subsequent in program order to a given instruction may still be able to execute when the given instruction is delayed in processing (e.g., due to a cache miss) if the instructions do not depend on the given instruction. Speculative execution of instructions may include predicting a branch path and fetching instructions down the predicted branch path. Each instruction fetched on the predicted path may be considered speculative until the predicted path is confirmed as the correct branch path. Both out of order instruction execution and speculative instruction execution may lead to an overall improvement in the performance of a single thread within a processor core.

As described above, MMU 270 may be configured to service an address translation request associated with a TLB miss. As previously described, a TLB miss may occur when a required virtual or real address to physical address translation is not located in an ITLB or DTLB within a processor core. In some embodiments, an increase in the number of instructions executing in parallel due to out of order instruction execution within a thread may result in an overall increased number of TLB misses. Speculative instruction execution may naturally lead to speculative TLB misses. In order to support improved single thread performance resulting from out of order and speculative instruction execution, without sacrificing multi-thread throughput within a core, MMU 270 may be configured to manage speculative TLB misses and an overall increased number of TLB misses. In some embodiments, MMU 270 may be configured to manage TLB misses fairly between threads such that one thread does not stall while waiting for another thread's TLB miss(es) to be resolved. MMU 270 may be configured to manage ITLB and DTLB misses fairly within a thread, such that the thread is not starved for instructions. In some embodiments, MMU 270 may be configured to minimize TLB miss latency and increase throughput by processing TLB misses in parallel, rather than serially. MMU 270 may be configured such that TLB miss resources allocated to a thread may be efficiently reclaimed when the thread is flushed due to an incorrectly predicted branch path or other system events.

In some embodiments, only one ITLB miss may be pending at any given time for a single thread. For example, instruction fetch unit (IFU) 200 may be configured such that a thread may fetch instructions down a single execution path, rather than following multiple speculative execution paths. In this example, when the thread encounters an ITLB miss on a particular path, the thread may be starved for instructions and may be likely to stall because the thread is only executing on the single execution path. In some embodiments, the system may require that the ITLB miss be serviced before execution of the thread can proceed. Since the thread may be stalled while waiting for the ITLB miss to be resolved, further ITLB misses may not occur for the thread until after the pending ITLB miss is resolved. As a result, in such embodiments MMU 270 may only need to be able to process one ITLB miss at a time from any given thread.

In some embodiments, multiple DTLB misses may be pending from a given thread at any given time. A thread may encounter a DTLB miss for any of the thread's memory reference instructions, such as load-type or store-type instructions. A DTLB miss is not likely to stall a thread, as other instructions may continue to execute. However, other load/store instructions within the thread may be delayed by similar DTLB misses since load/store instructions executing within the thread are likely to require the same data. In some embodiments, MMU 270 may be configured to simultaneously process multiple DTLB misses pending for a given thread. In some embodiments, MMU 270 may be configured to handle ITLB and DTLB misses separately. In some embodiments, the ITLB and DTLB may be configured to operate in parallel, such that an ITLB miss and one or more DTLB misses may be pending at any given time from the same thread. In such embodiments, MMU 270 may be configured to process ITLB and DTLB misses concurrently from the same thread, as described in more detail below.

Figure 3:
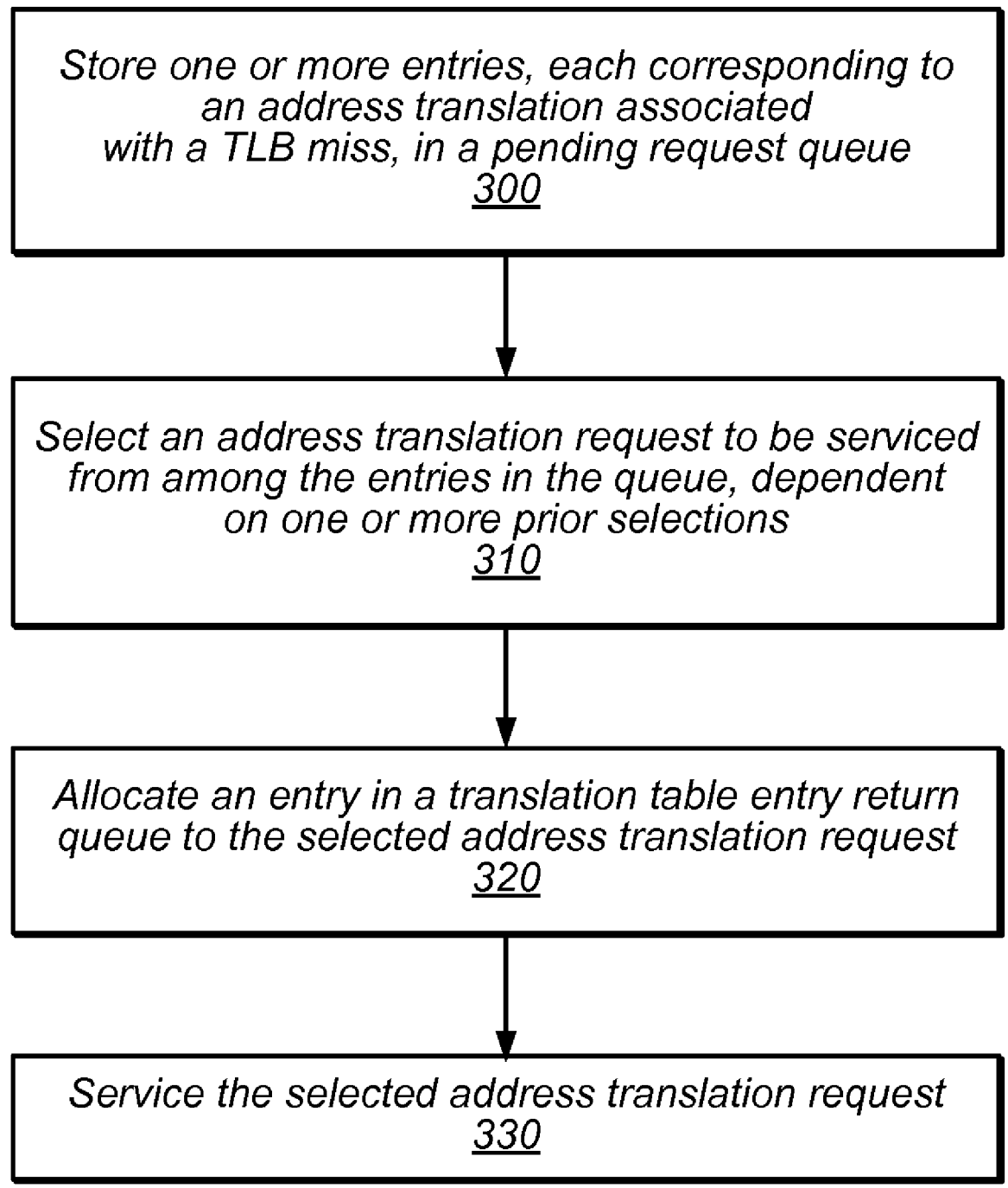
FIG. 3 is a flowchart illustrating a method for managing address translations associated with TLB misses, according to various embodiments.

The system described herein may, in some embodiments, be configured to manage MMU resources that are dedicated to servicing address translation requests associated with TLB misses. FIG. 3 is a flowchart illustrating a method for managing address translation requests associated with TLB misses, according to various embodiments. As illustrated in 300 of FIG. 3, the method may include storing one or more entries, each corresponding to an address translation, in a pending request queue (PRQ). For example, MMU 270 may be configured to store a PRQ entry corresponding to an address translation associated with an ITLB miss that has been encountered by a particular thread. In some embodiments, the entry may identify a virtual address to be translated to a physical address to allow the thread to fetch a particular instruction. In another example, MMU 270 may be configured to store a PRQ entry corresponding to an address translation associated with a potential DTLB miss that may be encountered for a given load/store instruction. In this example, MMU 270 may receive a request from pick unit 225 to reserve a PRQ entry for an address translation that may be needed if a thread experiences a DTLB miss during execution of the given load/store instruction. In some embodiments, pick unit 225 may be configured to issue the request to allocate a PRQ entry when the load/store instruction is picked from the pick queue.

In some embodiments, MMU 270 may include separate input and output pipelines for managing TLB misses associated with address translations. The input pipeline of MMU 270 may include a PRQ. In some embodiments, the PRQ may include control logic and a standard or custom array structure. The array structure of the PRQ may include two array portions, each configured to store a predetermined number of entries. One portion may be reserved for entries corresponding to ITLB misses, and one portion may be reserved for entries corresponding to potential DTLB misses. As described above, a single ITLB miss may be pending for a given thread at any given time. In one example, the portion of the PRQ reserved for entries corresponding to ITLB misses, referred to herein as the ITLB PRQ, may include eight entries, with one entry reserved for each thread of a core configured to execute eight threads. As described above, a given thread may have multiple DTLB misses pending at any given time. In some embodiments, the maximum number of pending DTLB misses may be bound by the number of DTLB PRQ entries. In one example, the portion of the PRQ reserved for entries associated with DTLB misses, referred to herein as the DTLB PRQ, may include 16 entries. In this example, a 16-entry queue may be sufficient to maintain pipelining of load and store instructions and to support a sufficient number of pending DTLB misses to avoid stalling threads with high DTLB miss rates. In other embodiments, the PRQ may contain a different number of entries, the PRQ entries may be divided differently between those corresponding to ITLB misses and those corresponding to potential DTLB misses, or the PRQ entries may not be divided into an instruction-related portion and a data-related portion at all.

As illustrated in 310 of FIG. 3, the method may include selecting, from the PRQ, an address translation request to be serviced, dependent on one or more prior selections. In some embodiments, the PRQ may be configured to hold pending address translation requests associated with ITLB and DTLB misses until the translations are selected by MMU 270 for servicing. Various methods for selecting an address translation from the PRQ are described in more detail below.

As described above, in some embodiments, MMU 270 may include separate input and output pipelines for processing TLB misses associated with address translation requests. For example, the output pipeline of MMU 270 may include a translation table entry return queue (TTERQ), which may include a predetermined number of entries. As illustrated in 320 of FIG. 3, the method may include allocating a TTERQ entry to the selected address translation request. In one example, the TTERQ may be configured as a 16-entry queue, with each entry configured to hold an address translation response returned from the L2 cache. In some embodiments, each TTERQ entry may include at least the following control bits: a valid bit, which may be set when the corresponding address translation request is sent to the L2 cache; a filled bit, which may be set when the L2 cache returns an address translation; and a flush bit, which may be set when the thread associated with the corresponding TLB miss is flushed. As illustrated in 330 of FIG. 3, the method may include servicing the selected address translation request. For example, MMU 270 may be configured to request and receive an address translation from the L2 cache and return the address translation to the appropriate TLB. Various methods for servicing an address translation request are described in more detail below.

Figure 4:
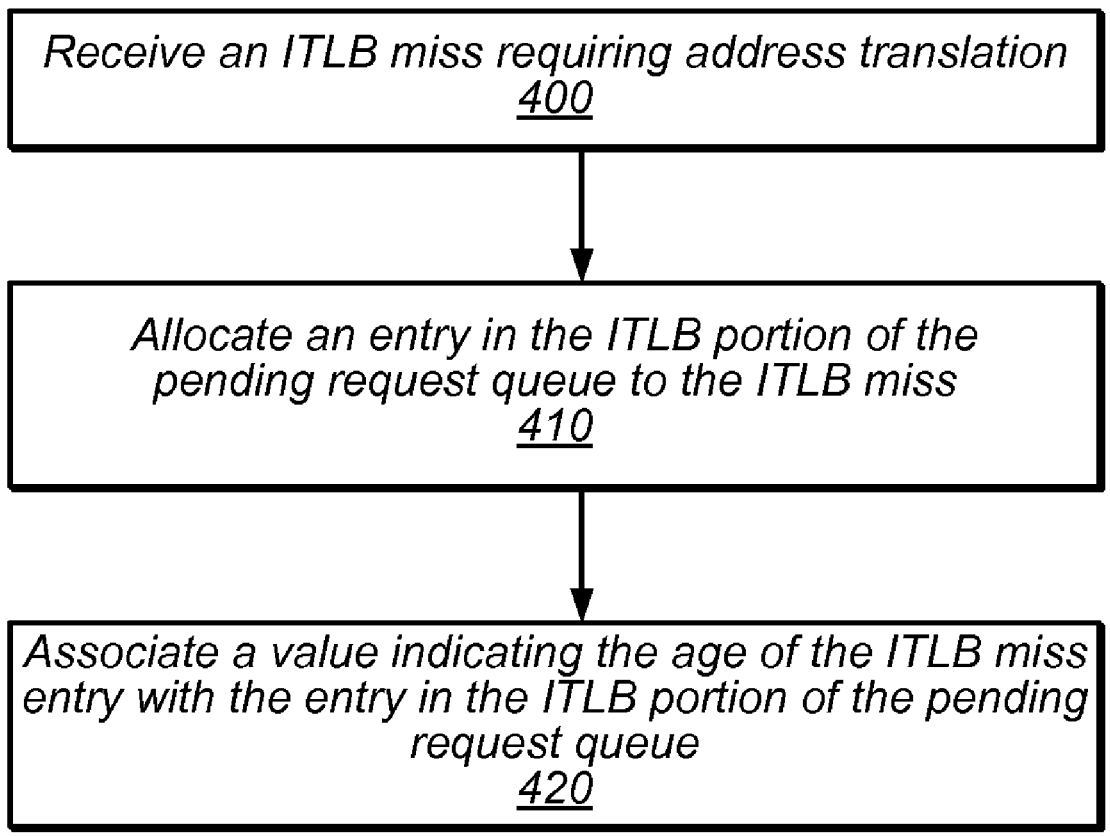
FIG. 4 is a flowchart illustrating a method for storing an entry corresponding to an ITLB miss in a queue for subsequent servicing, according to various embodiments.

As described above, MMU 270 may be configured to handle ITLB and DTLB misses separately. FIG. 4 is a flowchart illustrating a method for storing an entry corresponding to an ITLB miss in a queue for subsequent servicing, according to various embodiments. The method may include receiving an ITLB miss that requires an address translation, as shown in 400. As illustrated in FIG. 4, the method may include allocating an ITLB PRQ entry to the ITLB miss, as shown in 410. In some embodiments, each ITLB PRQ entry may be represented by an ITLB PRQ resource tag. For example, MMU 270 may be configured to allocate an ITLB PRQ entry to the ITLB miss and to assign a 3-bit ITLB PRQ resource tag corresponding to the ITLB PRQ entry to the ITLB miss. In some embodiments, the numerical value of the ITLB PRQ resource tag may indicate the numerical position of the entry in the ITLB PRQ and/or may be equivalent to an identifier of the thread that initiated the ITLB miss (i.e. the thread ID). As described above, the ITLB PRQ may be configured to include eight entries reserved for address translation requests corresponding to ITLB misses. As described above, only one ITLB miss may be pending at any given time for each thread within a core. Thus, in some embodiments, each ITLB entry in the PRQ may be reserved for a corresponding thread in a core configured to execute eight threads. In such embodiments, the numerical value of the resource tag representing an ITLB PRQ entry may be equivalent to the thread ID of the ITLB miss corresponding to the ITLB PRQ entry.

As illustrated in 420 of FIG. 4, the method may include associating a value that indicates the age of the ITLB miss with the entry in the ITLB PRQ. For example, each entry in the PRQ may include an age vector used to determine the age, and, thus, the input order of entries corresponding to ITLB misses within the ITLB PRQ. In some embodiments, MMU 270 may be configured to determine the value of the age vector and to store it in the ITLB PRQ entry corresponding to the ITLB miss, or to set the value in control logic within the PRQ associated with the entry. In some embodiments, MMU 270 may be configured to service address translations associated with ITLB misses in age order, dependent on the value of the age vector associated with each ITLB PRQ entry. Various methods for servicing an ITLB miss are described in more detail below.

Figure 5:
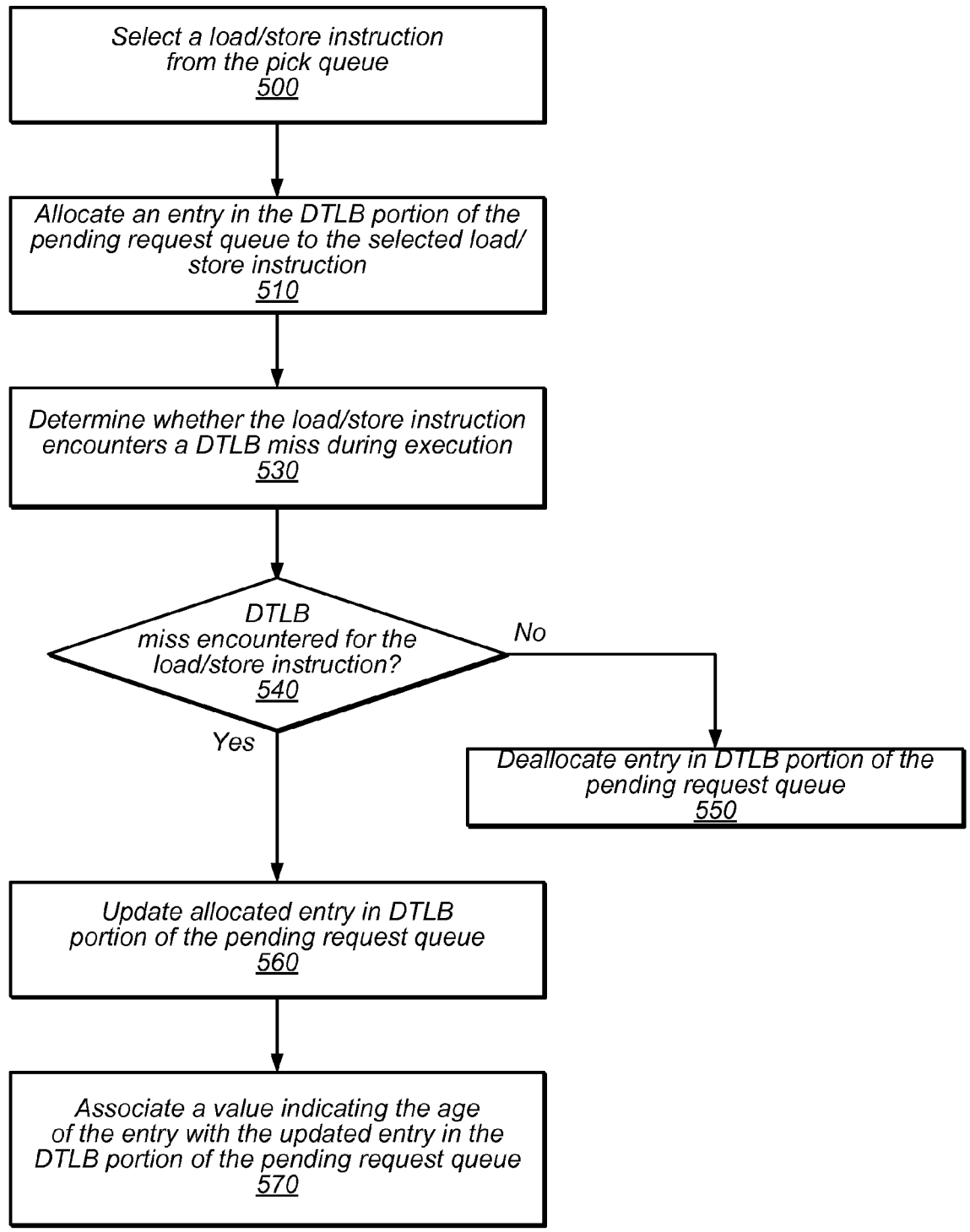
FIG. 5 is a flowchart illustrating a method for speculatively storing an entry corresponding to a potential DTLB miss in a queue and determining whether the entry represents a valid DTLB miss, according to various embodiments.

In some embodiments, DTLB miss resources may be speculatively allocated to load/store instructions to ensure that the resources are available in the case that a load/store instruction encounters a DTLB miss. FIG. 5 is a flowchart illustrating a method for speculatively storing an entry corresponding to a potential DTLB miss in the PRQ and determining whether the entry represents a valid DTLB miss, according to various embodiments. As shown in 500, the method may include selecting a load/store instruction from the pick queue for subsequent scheduling for execution. For example, pick unit 225 may be configured to select an instruction from the pick queue and forward the instruction to issue unit 230. Issue unit 230 may be configured to subsequently issue the instruction to an execution unit. As shown in 510, the method may include allocating a DTLB PRQ entry to the selected load/store instruction in response to receiving an indication that a load/store instruction has been selected from the pick queue (e.g., in response to receiving a request to allocate a PRQ entry from pick unit 225). For example, MMU 270 may be configured to speculatively allocate a DTLB PRQ entry to the load/store instruction and to assign a 4-bit DTLB PRQ resource tag corresponding to the DTLB PRQ entry to the load/store instruction.

As described above, multiple DTLB PRQ entries may be allocated to an individual thread. For example, the DTLB PRQ may include 16 entries reserved for DTLB misses, and any number of them may be allocated to any given thread. In some embodiments, the numerical values of the DTLB PRQ resource tags may have no sequential significance. In other words, a DTLB PRQ resource tag may indicate the position of the DTLB PRQ entry within the DTLB PRQ that corresponds to the resource tag, but may not indicate the relative order in which resource tags representing adjacent entries in the DTLB PRQ were allocated in the PRQ, or the relative order in which corresponding DTLB misses were encountered. In some embodiments, the DTLB PRQ entries may be allocated and deallocated out of order within the DTLB PRQ. For example, the DTLB PRQ entries may be deallocated in an order that is different from the order in which the entries were allocated. In another example, the DTLB PRQ entries may be allocated out of order with respect to the sequential position of the DTLB PRQ entries. In this example, multiple DTLB PRQ entries associated with a particular thread may not be sequentially adjacent within the DTLB PRQ. In such embodiments, the DTLB PRQ resource tags may not indicate the order in which the DTLB PRQ entries were allocated, and a particular resource tag may have no sequential relation to resource tags previously allocated or currently available to be allocated.

As illustrated in 530 of FIG. 5, the method may include determining whether the load/store instruction encounters a DTLB miss during execution. If the load/store instruction is committed without encountering a DTLB miss, shown as the negative exit of 540, the DTLB PRQ entry allocated to the load/store instruction may be deallocated, as shown in 550. For example, pick unit 225 may be configured to deallocate the DTLB PRQ entry corresponding to the DTLB PRQ resource tag assigned to the load/store instruction in response to receiving an indication of a DTLB hit for an address translation associated with the load/store instruction. If the load/store instruction encounters a DTLB miss, i.e. if the potential DTLB miss is realized as an actual DTLB miss, the pre-allocated PRQ entry corresponding to the DTLB miss is valid and may be updated with data reflecting the actual DTLB miss. This is shown as the positive exit of 540, and in 560. This updated entry may remain in the PRQ for subsequent servicing.

As illustrated in 570 of FIG. 5, the method may include associating a value that indicates the age of the DTLB entry with the entry in the DTLB PRQ. For example, each entry may include an age vector used to determine the age, and, thus, the input order of DTLB entries within the DTLB PRQ. In some embodiments, MMU 270 may be configured to initialize the age vector, and to store it in the DTLB PRQ entry corresponding to the potential DTLB miss, when the entry is allocated to a load/store instruction, or to set the value in control logic within the PRQ associated with the entry at that time. In other embodiments, the value of the age vector may be initialized or updated in response to determining that a potential DTLB miss has been realized as an actual DTLB miss, as shown in FIG. 5. In some embodiments, MMU 270 may be configured to service address translation requests associated with DTLB misses in age order, dependent on the value of the age vector stored in each DTLB PRQ entry. Various methods for servicing a DTLB miss are described in more detail below.

In some embodiments, the PRQ, or a portion thereof, may be implemented using a first-in, first-out type queue (i.e. a FIFO). In such embodiments, the inherent structure of a FIFO may simplify servicing ITLB entries in age order. For example, new entries may be shifted into the FIFO as ITLB PRQ entries are allocated to ITLB misses. Similarly, old entries may be shifted out of the FIFO as address translation requests corresponding to ITLB misses are serviced and the corresponding ITLB PRQ entries are deallocated. In such embodiments, the age of an ITLB miss within the ITLB PRQ may be determined by the position of the ITLB miss in the ITLB PRQ FIFO. The oldest ITLB misses may be located nearest the output side of the FIFO and the youngest ITLB misses may be located nearest the input side of the FIFO. In other embodiments, such as those described above, the PRQ may be implemented using a data structure type other than a FIFO, such as any standard or custom array structure that includes an associated age vector for each entry.

In embodiments in which the PRQ is implemented using a FIFO, the position of an ITLB PRQ entry within the FIFO may not be usable to identify the thread from associated with the corresponding ITLB miss. For example, since all entries may be shifted within the FIFO due to allocation and deallocation of PRQ entries, the position of each ITLB PRQ entry within the FIFO may not remain constant and, thus, may not be suitable for representing a thread ID associated with the corresponding ITLB miss. In such embodiments, the value of a DTLB PRQ resource tag assigned to a DTLB miss may not represent the entry position of the DTLB PRQ entry corresponding to the resource tag. In such embodiments, the resource tags may not be useable to identify the DTLB PRQ entries allocated to a particular thread.

In some embodiments, another method may be used to identify the thread associated with each TLB miss within a PRQ FIFO, or within a PRQ implemented using a structure other than a FIFO. For example, the thread ID may be stored in additional bits within each PRQ entry. In some embodiments, to deallocate an ITLB PRQ entry and/or multiple DTLB PRQ entries corresponding to a particular thread, MMU 270 may be configured to compare the identifier of the thread to each PRQ entry in order to identify the correct entries for deallocation. In some embodiments, MMU 270 may be configured to perform such a comparison when PRQ entries are deallocated due to the servicing of a TLB miss, or a flush of the thread associated with one or more TLB misses. Various methods for deallocating TLB PRQ entries in response to a thread flush are described in more detail below.

Figure 6:
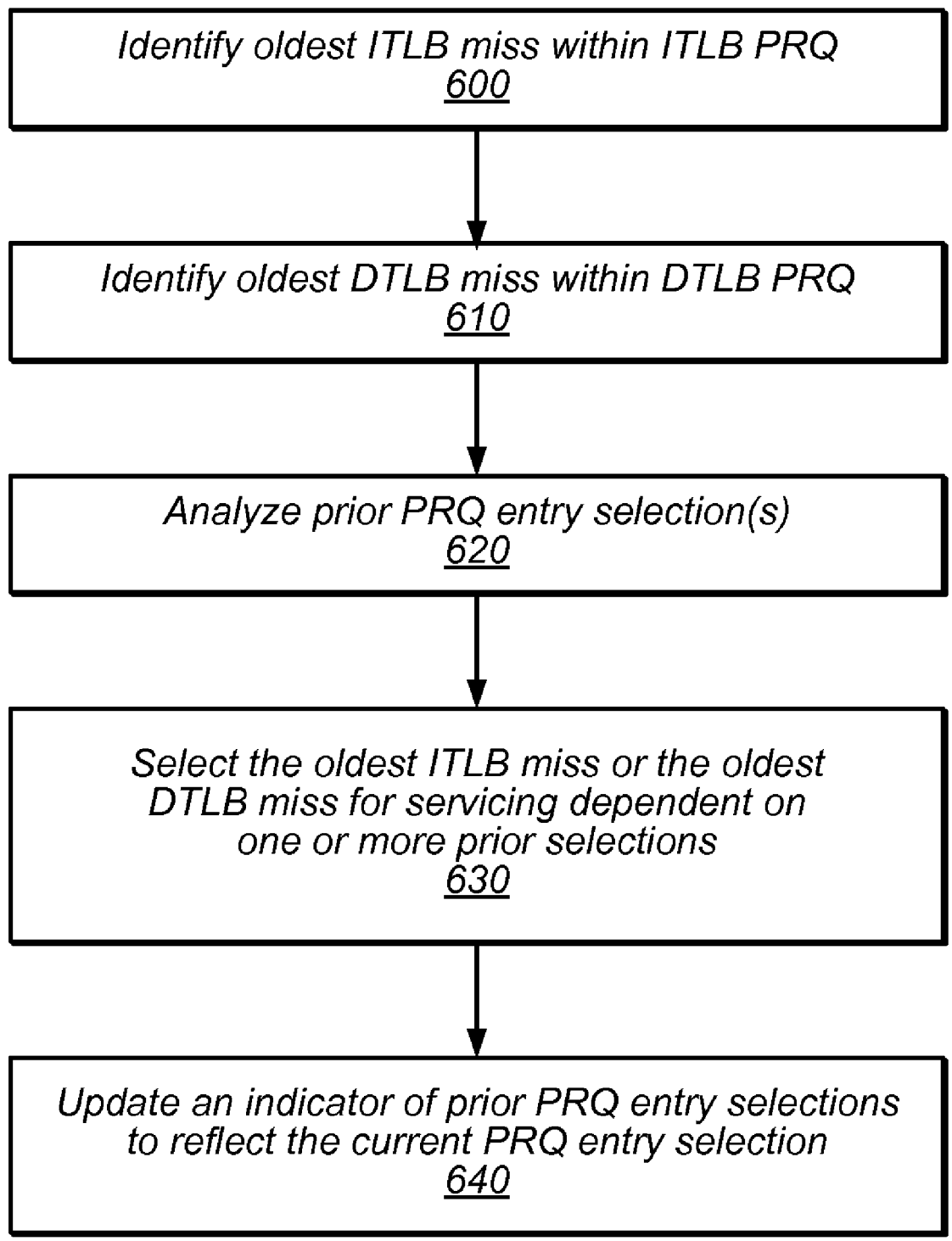
FIG. 6 is a flowchart illustrating a method for selecting a PRQ entry for servicing, according to various embodiments.

As described above, the PRQ may include entries corresponding to ITLB and DTLB misses, maintained in two separate groups, with each group having a separate age order. In some embodiments, MMU 270 may be configured to choose a TLB miss for servicing by selecting between an entry corresponding to an ITLB miss and an entry corresponding to a DTLB miss. FIG. 6 is a flowchart illustrating a method for selecting a PRQ entry for servicing, according to various embodiments. As shown in 600 and 610, the method may include identifying the oldest ITLB miss within the ITLB PRQ and the oldest DTLB miss within the DTLB PRQ, respectively. For example, MMU 270 may be configured to evaluate the age vector included in each TLB entry to identify the oldest ITLB miss and the oldest DTLB miss. In other embodiments, the operations illustrated in 600 and 610 of FIG. 6 may be executed in a different order than that shown in FIG. 6. For example, the oldest DTLB miss may be identified before the oldest ITLB miss, or the oldest ITLB and DTLB misses may be identified in parallel.

As illustrated in 620 of FIG. 6, the method may include analyzing one or more prior PRQ entry service selections. In one example, the prior PRQ entry selection may be stored in a single bit, referred to herein as a favor bit. The favor bit may be configured to indicate whether the last PRQ entry selected for servicing was an ITLB miss or a DTLB miss. For example, a favor bit value of one may indicate that the last TLB serviced was an ITLB miss and a favor bit value of zero may indicate that the last TLB serviced was a DTLB miss. In other embodiments, the encoding of the favor bit may be reversed. For example, a value of zero may indicate the previous selection of an ITLB miss and a value of one may indicate the previous selection of a DTLB miss. MMU 270 may be configured to examine the favor bit to determine what type of PRQ entry was last serviced.

As illustrated in 630 of FIG. 6, the method may include selecting the oldest ITLB miss or oldest DTLB miss for servicing dependent on the prior PRQ entry service selection(s). For example, MMU 270 may be configured to select the oldest ITLB miss for servicing if the favor bit indicates that the last TLB miss selected for servicing was a DTLB miss. In this example, MMU 270 may be configured to select the oldest DTLB miss for servicing if the favor bit indicates that the last TLB miss selected for servicing was an ITLB miss. In some embodiments, if only ITLB misses are pending, the oldest ITLB miss may be selected for servicing, or if only DTLB misses are pending, the oldest DTLB miss may be selected for servicing. As shown in 640, the method may include updating an indicator of prior PRQ entry selection(s) to reflect the current PRQ entry selection. For example, MMU 270 may be configured to reflect the current PRQ entry selection by inverting the favor bit. In this example, if the favor bit was equal to one before the PRQ entry selection, indicating that the last entry selected for servicing corresponded to an ITLB miss, the MMU may set the favor equal to zero to indicate that the current selection was an entry corresponding to a DTLB miss.

While the example above describes an embodiment in which TLB miss selections alternate between ITLB misses and DTLB misses, other algorithms for selecting a PRQ entry corresponding to TLB miss for servicing are possible. In some embodiments, TLB miss selections may not be distributed evenly between ITLB and DTLB misses. For example, ITLB misses may be prioritized over DTLB misses since an ITLB miss may be more likely to stall execution of a thread. In this example, the MMU may employ a selection algorithm that may select more ITLB misses than DTLB misses. For example, MMU 270 may be configured to select two ITLB misses in a row for servicing before selecting one DTLB miss for servicing, such that ITLB misses are serviced more frequently than DTLB misses. In other embodiments, more DTLB misses than ITLB misses may be selected. In general, MMU 270 may be configured to alternate between selection of one or more ITLB misses and selection of one or more DTLB misses according to any predetermined policy.

In other embodiments, criteria other than the type of TLB miss may be evaluated when determining a TLB miss selection. For example, a TLB miss originating from a thread executing on a known good path may be selected for servicing before a TLB miss originating from a thread executing on a speculative path, particularly if the speculative path is known to have low prediction accuracy. In one example, a DTLB miss originating from a thread executing on a known good path may be prioritized over an ITLB miss originating from a thread executing on a speculative path known to have low prediction accuracy. In other embodiments, TLB misses may be selected for servicing dependent on the number of TLB misses pending for multiple threads. For example, a TLB miss originating from a thread with a single pending TLB miss may be serviced before TLB misses originating from a thread having a large number of pending TLB misses so that the thread with the single pending TLB may quickly resume execution. In other embodiments, TLB misses originating from threads having a large number of pending TLB misses may be prioritized ahead of TLB misses originating from threads having fewer pending TLB misses.

Figure 7:
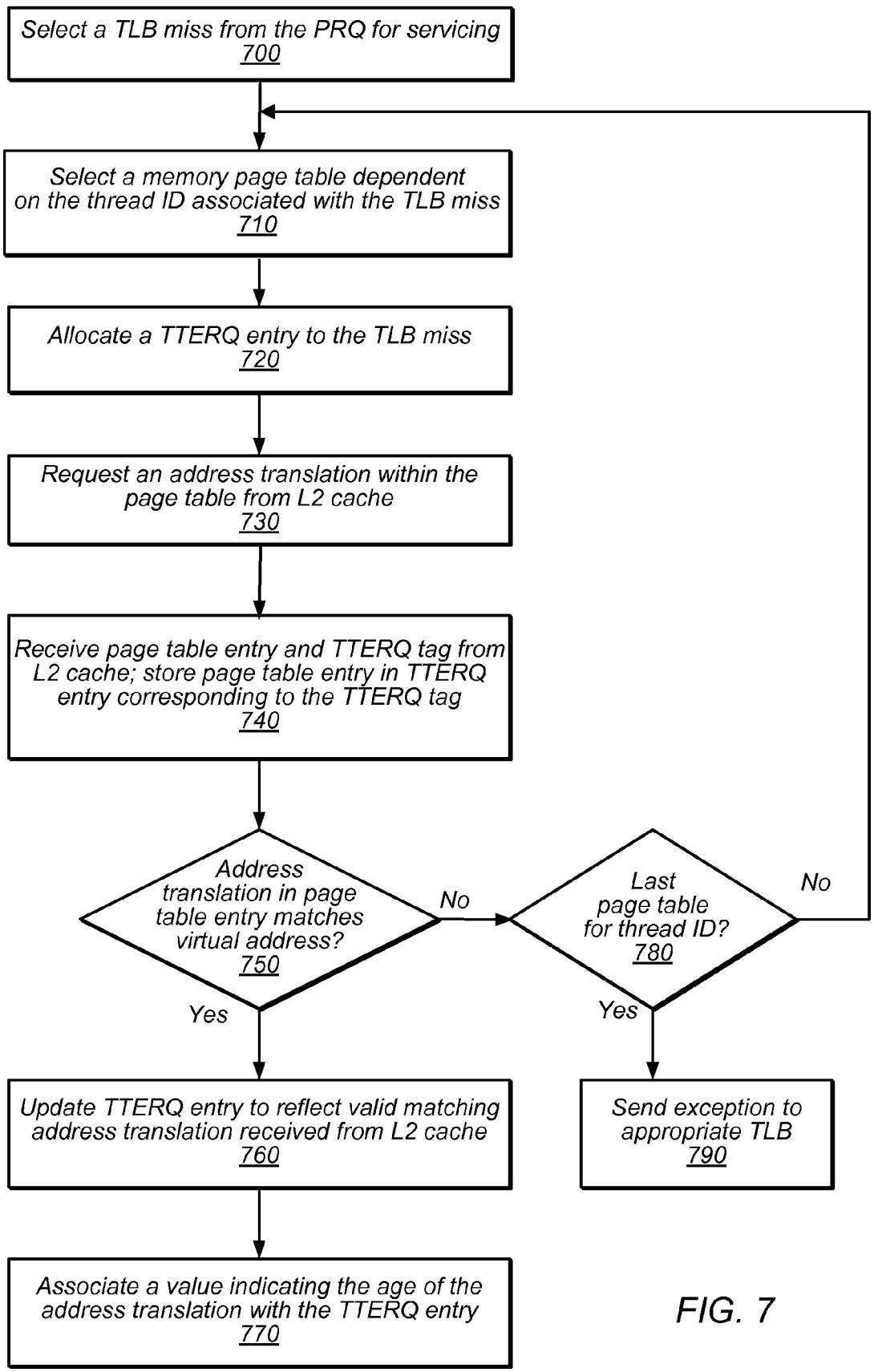
FIG. 7 is a flowchart illustrating a method for fulfilling an address translation for a selected TLB miss, according to various embodiments.

As described above, MMU 270 may be configured to manage one or more translation tables stored in system memory and to traverse such tables, i.e. execute a hardware page table walk, in response to an address translation request associated with a TLB miss. FIG. 7 is a flowchart illustrating a method for fulfilling an address translation request for a TLB miss selected for servicing from among those represented by entries in the PRQ, according to various embodiments. As shown in 700, the method may include selecting a TLB miss from the PRQ for servicing. In various embodiments, the TLB miss may be selected using the method illustrated in FIG. 6, or using another method. As shown in 710, the method may include selecting a memory page table to be searched for the requested address translation dependent on the thread ID associated with the selected TLB miss. In some embodiments, MMU 270 may be configured to generate a page table index into the selected page table. In such embodiments, this index may represent the page table entry containing the address translation required to service the TLB miss.

As illustrated in 720 of FIG. 7, the method may include allocating a TTERQ resource tag to the selected TLB miss. In some embodiments, MMU 270 may be configured to allocate a TTERQ entry to the selected TLB miss, and to assign a 4-bit TTERQ resource tag corresponding to the TTERQ entry to the TLB miss. In some embodiments, MMU 270 may be configured to set the valid bit in the TTERQ entry, indicating that the request has been sent to the L2 cache. As shown in 730, the method may include requesting the address translation from the L2 cache. For example, MMU 270 may be configured to place a request for the page table entry into the input queue of the L2 cache. In some embodiments, MMU 270 may be configured to execute operations 720 and 730 in an order different than illustrated in FIG. 7, or in parallel. In one example, the TTERQ may be configured to contain 16 entries. In this example, MMU 270 may be configured to have up to 16 page table searches pending at any given time.

As illustrated in 740 of FIG. 7, the method may include receiving a page table entry, which may or may not include the requested address translation, and the TTERQ tag from the L2 cache. As illustrated in 740, the method may also include storing the returned page table entry in the TTERQ entry corresponding to the TTERQ resource tag received from the L2 cache (i.e. buffering the returned data in the TTERQ entry until it can be validated). In some embodiments, MMU 270 may be configured to compare the address translation in the returned page table entry to the virtual address of the TLB miss included in the TTERQ entry corresponding to the TTERQ tag received from the L2 cache. If the address translation matches, shown as the positive exit of 750, TTERQ entry may be updated to reflect that the address translation in the returned page table entry is a valid matching address translation, as shown in 760. For example, MMU 270 may be configured to set the filled bit for the TTERQ entry to indicate that the address translation request has been satisfied. In other embodiments, the method may include comparing the address translation included in the returned page table entry to the requested address translation prior to storing the returned page table entry (and/or an address translation included therein) in the TTERQ entry. In such embodiments, the returned page table entry may not be buffered in the TTERQ entry prior to determining if it is a valid matching address translation, and may only be stored in the TTERQ entry if it is determined to be a valid matching address translation (not shown).

In some embodiments, the method may include associating a value that indicates the age of the address translation with the TTERQ entry, as shown in 770. For example, MMU 270 may be configured to set the age vector in each TTERQ entry (or in associated control logic) to indicate the order in which address translations were received from the L2 cache. In some embodiments, the L2 cache may return address translations out of order, i.e. in an order different from the order in which the address translation requests were sent to the L2 cache. In such embodiments, the age vectors in each TTERQ entry may be used to determine the oldest address translation response within the TTERQ.

If the address translation in the page table entry returned by the L2 cache does not match the virtual address in the TTERQ entry, shown as the negative exit of 750, the method may include determining whether the last page table for a thread ID has been searched, as shown in 780. If additional page tables corresponding to the thread ID have not yet been searched, shown as the negative exit of 780, the method may include selecting another page table to search dependent on the thread ID of the TLB miss. If the last page table corresponding to a thread ID has been searched, shown as the positive exit of 780, the method may include sending an exception to the appropriate TLB, as shown in 790. For example, MMU 270 may be configured to return an indication of an exception to the TLB associated with the TLB miss, indicating that an address translation has not been found. In some embodiments, the TLB may be configured to generate a trap to allow a memory management software routine to handle the translation, in response to receiving the indication of the exception.

Figure 8:
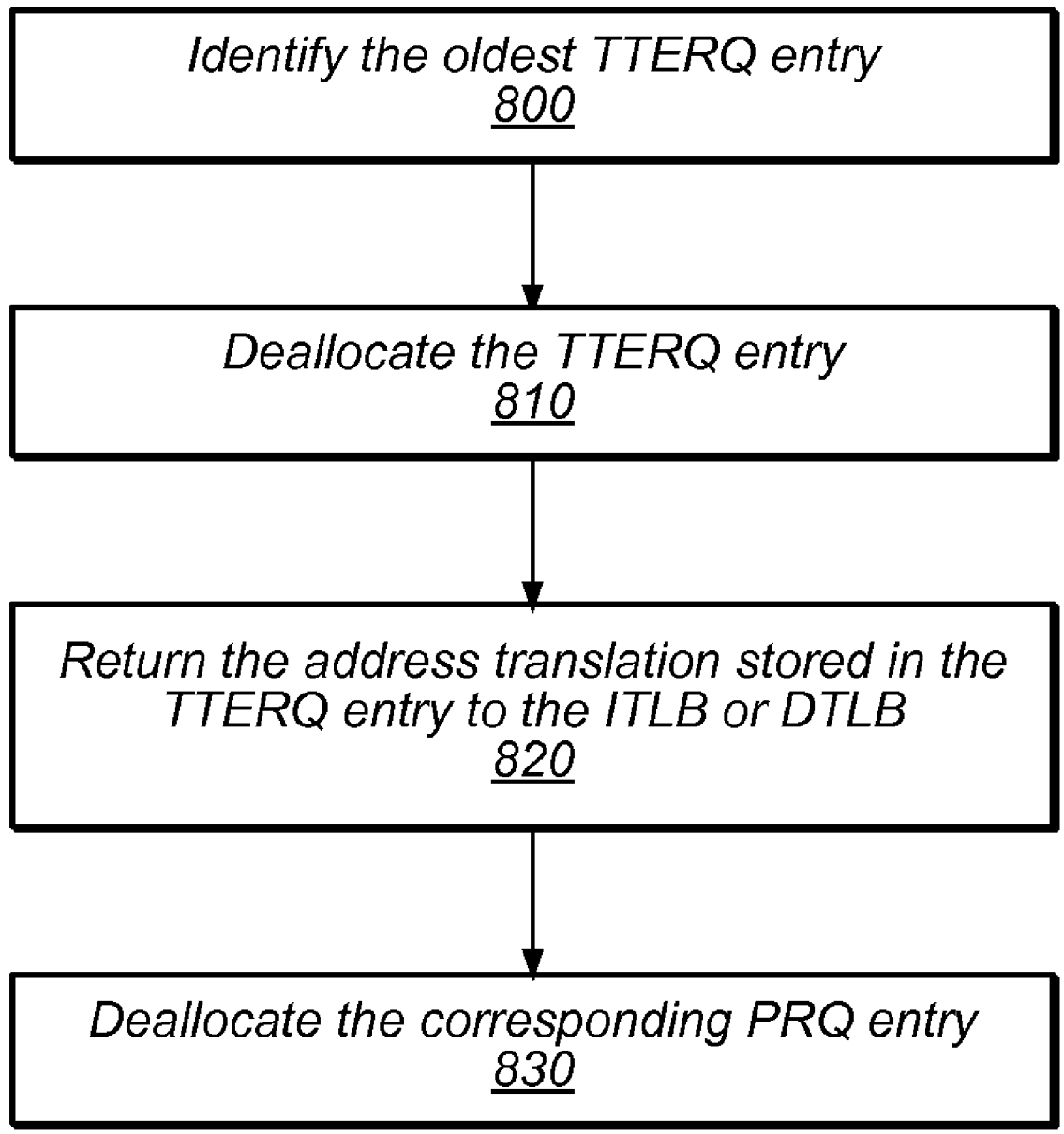
FIG. 8 is a flow chart illustrating a method for processing address translations from the TTERQ, according to various embodiments.

In some embodiments, TTERQ entries that include valid address translations, as indicated by the value of the filled bit for each entry, may be processed from the TTERQ in age order. FIG. 8 is a flow chart illustrating a method for processing address translations from the TTERQ, according to various embodiments. As shown in 800, the method may include identifying the oldest entry in the TTERQ, i.e. the oldest TLB miss that has had a valid address translation returned from the L2 cache. For example, MMU 270 may be configured to service the TTERQ entries in age order, oldest to youngest. In some embodiments, MMU 270 may be configured to evaluate the age vectors for each of the TTERQ entries and to select the oldest TTERQ entry for processing. As shown in 810, the method may include deallocating the selected TTERQ entry. For example, MMU 270 may be configured to deallocate the TTERQ entry by clearing the valid bit in the TTERQ entry, which may indicate that the TTERQ entry is available for allocation.

As shown in 820, the method may include returning the address translation stored in the TTERQ entry to the appropriate TLB. For example, MMU 270 may be configured to return the address translation included in the entry to the ITLB if the selected TTERQ entry is associated with an ITLB miss or to return the address translation to the DTLB if the selected TTERQ entry is associated with a DTLB miss. The method may include deallocating the PRQ entry for the serviced TLB miss, as shown in 830. For example, MMU 270 may be configured to deallocate the PRQ entry allocated to the TLB miss by clearing the valid bit of the PRQ entry designated by the PRQ resource tag assigned to the TLB miss.

In some embodiments, various system events, such as branch mispredictions, instruction exceptions, or external interrupts, may require that all instructions assigned to a single thread be flushed. In such embodiments, in response to a thread flush, all MMU resources allocated to the thread may be deallocated. For example, MMU 270 may be configured to deallocate all PRQ and/or TTERQ entries assigned to the flushed thread. In some embodiments, all PRQ entries assigned to a flushed thread may be deallocated in response to receiving an indication of the thread flush. For example, MMU 270 may be configured to deallocate an ITLB PRQ entry allocated to a particular thread by clearing the valid bit of the ITLB PRQ entry corresponding to the thread ID of the flushed thread. In another example, MMU 270 may be configured to simultaneously deallocate multiple DTLB PRQ entries allocated to a flushed thread. As described above, the numerical identifier of a DTLB PRQ tag may be equivalent to the DTLB PRQ entry position. MMU 270 may be configured to deallocate all DTLB PRQ entries corresponding to the DTLB PRQ resource tags assigned to a flushed thread. In some embodiments, the DTLB PRQ entries may be deallocated out of order. As described above, the values of the numerical identifiers of the resource tags representing DTLB PRQ entries may have no sequential significance. Accordingly, a resource tag representing a particular entry position in the DTLB PRQ may have no sequential relationship with resource tags representing adjacent entries in the DTLB PRQ and no sequential relationship with resource tags previously deallocated.

As described above, in some embodiments, the PRQ may be configured as a FIFO. In such embodiments, the position of an ITLB PRQ entry within the FIFO may not be useable to identify the thread from which the corresponding ITLB miss was initiated. Similarly, the position of a DTLB PRQ entry within the PRQ FIFO may not be equivalent to the resource tag corresponding to the DTLB PRQ entry. As a result, the DTLB PRQ resource tags assigned to a particular thread may not be usable to identify the DTLB PRQ entries allocated to the thread. As described above, the thread ID associated with each TLB miss may be stored in additional bits within each PRQ FIFO entry, or in associated control logic, in various embodiments.

To determine the PRQ entries to deallocate in the event of a thread flush, MMU 270 may be configured to compare the identifier of the flushed thread to each PRQ entry. As described above, in some embodiments, only one ITLB miss may be pending at any given time for a given thread. In such embodiments, MMU 270 may be configured to deallocate one ITLB PRQ entry in response to a thread flush. As previously described, multiple DTLB misses may be pending for a thread at any given time, in some embodiments. In such embodiments, MMU 270 may be configured to deallocate all DTLB PRQ entries associated with a thread ID matching the thread ID of the flushed thread. In some embodiments, deallocating entries within a PRQ implemented as a FIFO due to a thread flush may result in "holes" within the FIFO, i.e. FIFO entries that are no longer allocated to a TLB miss, but are physically located within the FIFO between other entries that remain allocated to TLB misses. In such embodiments, these "holes" may be collapsed by shifting the appropriate FIFO entries toward the output side of the FIFO. In embodiments in which the PRQ is implemented using a structure other than a FIFO, the issue of leaving "holes" within the structure may not apply.

As described above, a TTERQ entry may be allocated to a TLB miss when the address translation request is sent to the L2 cache. In some embodiments, the thread associated with the TLB miss may be flushed while the L2 cache is fetching the requested address translation. In some embodiments, the L2 cache may be allowed to continue the fetch operation, even though the thread has been flushed and may no longer need the address translation. In some such embodiments, MMU 270 may be configured to set a flush bit in the TTERQ entry corresponding to the TLB miss associated with the flushed thread to indicate that the thread has been flushed.

As described above, MMU 270 may be configured to store an address translation received from the L2 cache into the TTERQ entry corresponding to the TTERQ tag returned from the L2 cache with the address translation. In some embodiments, MMU 270 may be configured to evaluate the flush bit of the TTERQ entry prior to storing the address translation within the TTERQ entry. In such embodiments, if the flush bit in the TTERQ entry is set, MMU 270 may be configured not to write the address translation into the TTERQ entry. In some embodiments, the TTERQ entry corresponding to the flushed thread may remain in the TTERQ until the TTERQ entry is selected for processing by MMU 270. In such embodiments, MMU 270 may be configured to evaluate the flush bit to determine whether the thread associated with the TLB miss in the TTERQ entry has been flushed. In this example, in response to determining that the flush bit for the TTERQ entry has been set, MMU 270 may be configured to not return the address translation response to the TLB associated with the TLB miss. MMU 270 may be configured to deallocate the TTERQ and PRQ entries corresponding to the TLB miss associated with the flushed thread, using a similar method to that described above.

Example System Embodiment

Figure 9:
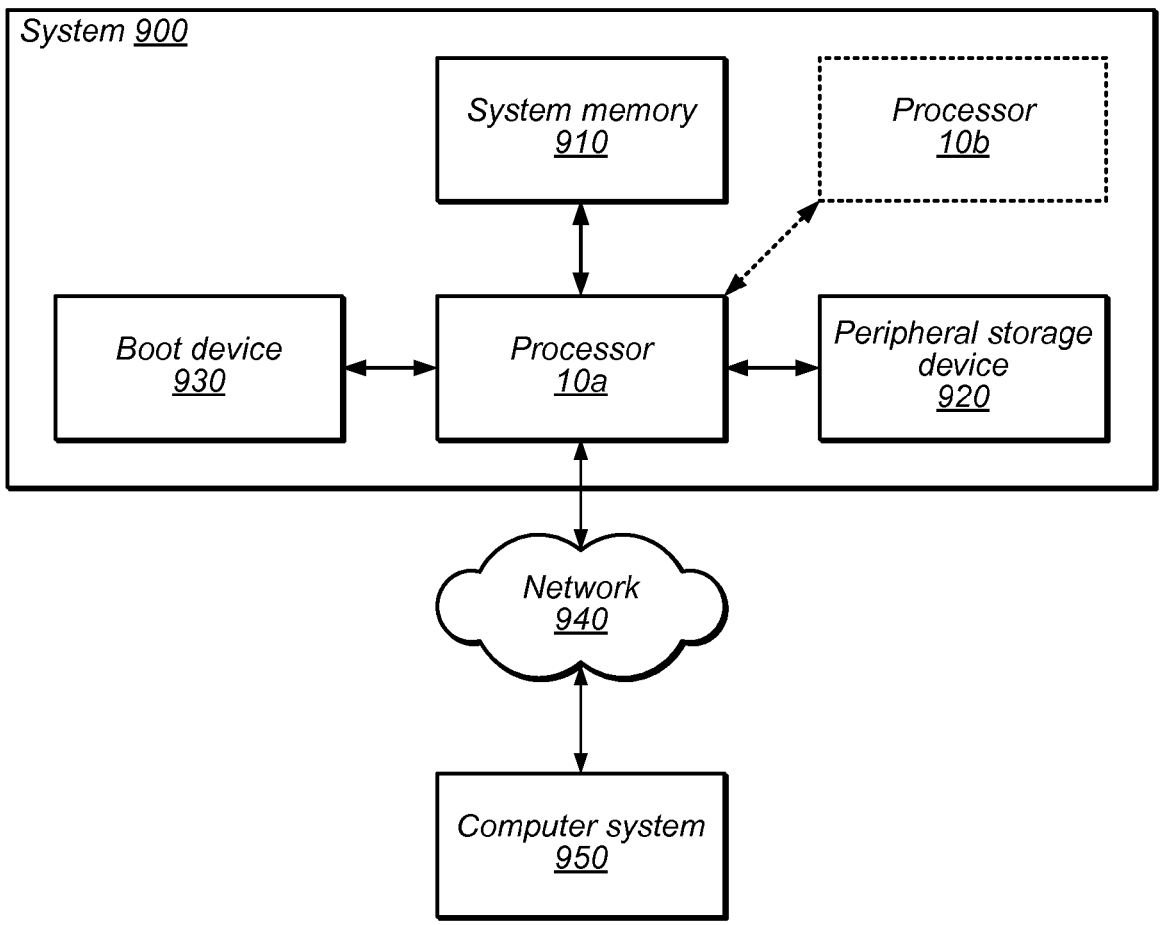
FIG. 9 is a block diagram illustrating one embodiment of a system including a multithreaded processor.

As described above, in some embodiments, processor 10 of FIG. 1 may be configured to interface with a number of external devices. One embodiment of a system including processor 10 is illustrated in FIG. 9. In the illustrated embodiment, system 900 includes an instance of processor 10, shown as processor 10a, that is coupled to a system memory 910, a peripheral storage device 920 and a boot device 930. System 900 is coupled to a network 940, which is in turn coupled to another computer system 950. In some embodiments, system 900 may include more than one instance of the devices shown. In various embodiments, system 900 may be configured as a rack-mountable server system, a standalone system, or in any other suitable form factor. In some embodiments, system 900 may be configured as a client system rather than a server system.

In some embodiments, system 900 may be configured as a multiprocessor system, in which processor 10a may optionally be coupled to one or more other instances of processor 10, shown in FIG. 9 as processor 10b. For example, processors 10a-b may be coupled to communicate via their respective coherent processor interfaces 140.

In various embodiments, system memory 910 may comprise any suitable type of system memory as described above, such as FB-DIMM, DDR/DDR2/DDR3/DDR4 SDRAM, or RDRAM®, for example. System memory 910 may include multiple discrete banks of memory controlled by discrete memory interfaces in embodiments of processor 10 that provide multiple memory interfaces 130. Also, in some embodiments, system memory 910 may include multiple different types of memory.

Peripheral storage device 920, in various embodiments, may include support for magnetic, optical, or solid-state storage media such as hard drives, optical disks, nonvolatile RAM devices, etc. In some embodiments, peripheral storage device 920 may include more complex storage devices such as disk arrays or storage area networks (SANs), which may be coupled to processor 10 via a standard Small Computer System Interface (SCSI), a Fibre Channel interface, a Firewire® (IEEE 1394) interface, or another suitable interface. Additionally, it is contemplated that in other embodiments, any other suitable peripheral devices may be coupled to processor 10, such as multimedia devices, graphics/display devices, standard input/output devices, etc. In some embodiments, peripheral storage device 920 may be coupled to processor 10 via peripheral interface(s) 150 of FIG. 1.

As described previously, in some embodiments boot device 930 may include a device such as an FPGA or ASIC configured to coordinate initialization and boot of processor 10, such as from a power-on reset state. Additionally, in some embodiments boot device 930 may include a secondary computer system configured to allow access to administrative functions such as debug or test modes of processor 10.

Network 940 may include any suitable devices, media and/or protocol for interconnecting computer systems, such as wired or wireless Ethernet, for example. In various embodiments, network 940 may include local area networks (LANs), wide area networks (WANs), telecommunication networks, or other suitable types of networks. In some embodiments, computer system 950 may be similar to or identical in configuration to illustrated system 900, whereas in other embodiments, computer system 950 may be substantially differently configured. For example, computer system 950 may be a server system, a processor-based client system, a stateless "thin" client system, a mobile device, etc. In some embodiments, processor 10 may be configured to communicate with network 940 via network interface(s) 160 of FIG. 1.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:
1. A method, comprising:
using a computer to perform:
storing data in one or more entries in a pending request queue comprising:
an instruction-related portion configured to store entries corresponding to pending address translations associated with instruction translation lookaside buffer (ITLB) misses; and
a data-related portion configured to store entries corresponding to address translations associated with potential or actual data translation lookaside buffer (DTLB) misses;
selecting an address translation to be serviced from among address translations associated with a plurality of entries in the pending request queue, wherein said selecting is dependent on one or more prior address translation selections;
allocating an entry associated with the selected address translation in a translation table entry return queue configured to store translation table entry responses; and
servicing the selected address translation.

2. The method of claim 1, further comprising, prior to said storing, using the computer to perform:
receiving an indication of an ITLB miss;
wherein said storing comprises storing data in an entry corresponding to the ITLB miss in the instruction-related portion of the pending request queue.

3. The method of claim 1,
further comprising, prior to said storing, using the computer to perform:
receiving an indication that a load-type or store-type instruction has been selected from a pick queue; and
allocating an entry corresponding to a potential DTLB miss for the load-type or store-type instruction in the data-related portion of the pending request queue;
wherein said storing comprises storing data in the allocated entry in response to determining that the potential DTLB miss is realized as an actual DTLB miss.

4. The method of claim 1, further comprising,
using the computer to perform:
receiving an indication that a load-type or store-type instruction has been selected from a pick queue;
allocating an entry corresponding to a potential DTLB miss for the load-type or store-type instruction in the data-related portion of the pending request queue;
receiving an indication of a DTLB hit for the load-type or store-type instruction; and
in response to receiving the indication of the DTLB hit, deallocating the entry corresponding to the potential DTLB miss for the load-type or store-type instruction in the data-related portion of the pending request queue.

5. The method of claim 1, wherein said selecting an address translation to be serviced comprises selecting between an entry in the instruction-related portion of the pending request queue and an entry in the data-related portion of the pending request queue, dependent on one or more prior selections between entries in the instruction-related portion of the pending request queue and entries in the data-related portion of the pending request queue.

6. The method of claim 5, wherein each entry in the pending request queue is associated with an age indicator, wherein the entry in the instruction-related portion of the pending request queue comprises an oldest entry in the instruction-related portion of the pending request queue, and wherein the entry in the data-related portion of the pending request queue comprises an oldest entry in the data-related portion of the pending request queue.

7. The method of claim 5, wherein said selecting an address translation to be serviced comprises alternating between selection of one or more entries in the instruction-related portion of the pending request queue and selection of one or more entries in the data-related portion of the pending request queue according to a predetermined policy.

8. The method of claim 1, wherein said servicing comprises:
searching one or more memory page tables for an address translation corresponding to the selected address translation;
if said searching returns an address translation:
determining whether the returned address translation matches the selected address translation; and
if the returned address translation matches the selected address translation, updating the entry associated with the selected address translation in the translation table entry return queue configured to store translation table entry responses;
returning the matching address translation or an error indicating that an address translation was not found;
deallocating the entry associated with the selected address translation in the translation table entry return queue configured to store translation table entry responses; and
deallocating the entry associated with the selected address translation in the pending request queue.

9. The method of claim 1, further comprising,
using the computer to perform:
detecting a thread flush; and
in response to detecting the thread flush, deallocating one or more entries associated with the flushed thread in the pending request queue or in the translation table entry return queue configured to store translation table entry responses.

10. A processor, comprising:
a memory management unit configured to:
store data in one or more entries in a pending request queue comprising:
an instruction-related portion configured to store entries corresponding to pending address translations associated with instruction translation lookaside buffer (ITLB) misses; and
a data-related portion configured to store entries corresponding to address translations associated with potential or actual data translation lookaside buffer (DTLB) misses;
select an address translation to be serviced from among address translations associated with a plurality of entries in the pending request queue, wherein said selecting is dependent on one or more prior address translation selections;
allocate an entry associated with the selected address translation in a translation table entry return queue configured to store translation table entry responses; and
service the selected address translation.

11. The processor of claim 10, wherein the memory management unit is further configured to:
receive an indication of an ITLB miss;
receive an indication that a load-type or store-type instruction has been selected from a pick queue;
in response to receiving an indication of an ITLB miss, store data in an entry corresponding to the ITLB miss in the instruction-related portion of the pending request queue;
in response to receiving an indication that a load-type or store-type instruction has been selected from the pick queue, allocate an entry corresponding to a potential DTLB miss for the load-type or store-type instruction in the data-related portion of the pending request queue; and
in response to determining that a given potential DTLB miss is realized as an actual DTLB miss, store data in an allocated entry corresponding to the given potential DTLB miss in the data-related portion of the pending request queue.

12. The processor of claim 10, wherein the memory management unit is further configured to:

receive an indication of a DTLB hit for a given load-type or store-type instruction; and in response to receiving an indication of a DTLB hit for a given load-type or store-type instruction, deallocating an entry corresponding to a potential DTLB miss for the given load-type or store-type instruction in the data-related portion of the pending request queue.

13. The processor of claim 10, wherein to select an address translation to be serviced, the memory management unit is configured to select between an entry in the instruction-related portion of the pending request queue and an entry in the data-related portion of the pending request queue, dependent on one or more prior selections between entries in the instruction-related portion of the pending request queue and entries in the data-related portion of the pending request queue.

14. The processor of claim 10, wherein to service the selected address translation, the memory management unit is configured to:

search one or more memory page tables for an address translation corresponding to the selected address translation;

in response to receiving an address translation from the search:

determine whether the received address translation matches the selected address translation; and in response to determining that the received address translation matches the selected address translation, update the entry associated with the selected address translation in the translation table entry return queue configured to store translation table entry responses;

return the matching address translation or an error indicating that an address translation was not found;

deallocate the entry associated with the selected address translation in the translation table entry return queue configured to store translation table entry responses; and deallocate the entry associated with the selected address translation in the pending request queue.

15. The processor of claim 10, wherein the memory management unit is further configured to:

receive an indication of a detected thread flush; and in response to receiving the indication of the detected thread flush, deallocate one or more entries associated with the flushed thread in the pending request queue or in the translation table entry return queue configured to store translation table entry responses.

16. A system, comprising:

a processor; and a memory coupled to the processor and storing instructions executable by the processor;

wherein the processor comprises a memory management unit configured to:

store data in one or more entries in a pending request queue comprising:

an instruction-related portion configured to store entries corresponding to pending address translations associated with instruction translation lookaside buffer (ITLB) misses; and a data-related portion configured to store entries corresponding to address translations associated with potential or actual data translation lookaside buffer (DTLB) misses;

select an address translation to be serviced from among address translations associated with a plurality of entries in the pending request queue, wherein said selecting is dependent on one or more prior address translation selections;

allocate an entry associated with the selected address translation in a translation table entry return queue configured to store translation table entry responses; and service the selected address translation.

17. The system of claim 16, wherein the memory management unit is further configured to:

receive an indication of an ITLB miss;

receive an indication that a load-type or store-type instruction has been selected from a pick queue;

in response to receiving an indication of an ITLB miss, store data in an entry corresponding to the ITLB miss in the instruction-related portion of the pending request queue;

in response to receiving an indication that a load-type or store-type instruction has been selected from the pick queue, allocate an entry corresponding to a potential DTLB miss for the load-type or store-type instruction in the data-related portion of the pending request queue; and in response to determining that a given potential DTLB miss is realized as an actual DTLB miss, store data in an allocated entry corresponding to the given potential DTLB miss in the data-related portion of the pending request queue.

18. The system of claim 16, wherein to select an address translation to be serviced, the memory management unit is configured to select between an entry in the instruction-related portion of the pending request queue and an entry in the data-related portion of the pending request queue, dependent on one or more prior selections between entries in the instruction-related portion of the pending request queue and entries in the data-related portion of the pending request queue.

19. The system of claim 16, wherein to service the selected address translation, the memory management unit is configured to:

search one or more memory page tables for an address translation corresponding to the selected address translation;

in response to receiving an address translation from the search:

determine whether the received address translation matches the selected address translation; and in response to determining that the received address translation matches the selected address translation, update the entry associated with the selected address translation in the translation table entry return queue configured to store translation table entry responses;

return the matching address translation or an error indicating that an address translation was not found;

deallocate the entry associated with the selected address translation in the translation table entry return queue configured to store translation table entry responses; and deallocate the entry associated with the selected address translation in the pending request queue.

20. The system of claim 16, wherein the memory management unit is further configured to:

receive an indication of a detected thread flush; and in response to receiving the indication of the detected thread flush, deallocate one or more entries associated with the flushed thread in the pending request queue or in the translation table entry return queue configured to store translation table entry responses.

* * * * *